CHARACTER IDENTIFICATION DEVICE

Filed Feb. 5, 1960 28 Sheets-Sheet 1

INVENTOR
JOHN E. GAFFNEY, JR.
ARTHUR A. KUSNICK
BY Geoffrey Knight
ATTORNEY

FIG.3

| CHARACTER | IDENTIFIED CHARACTER | VERTICAL = 16 | SLANT RIGHT = 9 | SLANT LEFT = 4 | HORIZONTAL = 1 | TOTAL CHARACTER WEIGHT |
|---|---|---|---|---|---|---|
| A | A | 0 | 1 | 1 | 1 | 14 |
| B | B | 3 | 0 | 0 | 4 | 52 |
| C | C | 3 | 0 | 0 | 2 | 50 |
| D | D | 2 | 0 | 0 | 2 | 34 |
| E | E | 1 | 0 | 0 | 3 | 19 |
| F | F | 1 | 0 | 0 | 2 | 18 |
| G | G | 3 | 0 | 0 | 3 | 51 |
| H | H | 2 | 0 | 0 | 5 | 37 |
| I | I | 1 | 0 | 0 | 0 | 16 |
| J | J | 1 | 0 | 1 | 1 | 21 |
| K | K | 1 | 1 | 1 | 0 | 29 |
| L | L | 1 | 0 | 0 | 1 | 17 |
| M | M | 2 | 1 | 1 | 0 | 45 |
| N | N | 2 | 0 | 1 | 0 | 36 |
| O | O | 2 | 0 | 0 | 3 | 35 |
| P | P | 0 | 2 | 0 | 2 | 20 |
| Q | Q | 0 | 2 | 1 | 2 | 24 |
| R | R | 2 | 0 | 1 | 2 | 38 |
| S | S | 4 | 0 | 0 | 3 | 67 |
| T | T | 3 | 0 | 0 | 1 | 49 |
| U | U | 2 | 0 | 0 | 1 | 33 |
| V | V | 0 | 1 | 1 | 0 | 13 |
| W | W | 0 | 2 | 2 | 0 | 26 |
| X | X | 0 | 1 | 1 | 2 | 15 |
| Y | Y | 1 | 1 | 1 | 1 | 30 |
| Z | Z | 0 | 1 | 0 | 2 | 11 |

FLIP-FLOP

"AND" GATES

"OR" GATES

INVERTER

AMPLIFIER (NON-INVERTING)

AMPLIFIER (INVERTING)

MATRIX

CHARACTER IDENTIFICATION DEVICE

FIG. 15a

| CHARACTER NORMAL | CHARACTER IDENT | SCHEMATIC REFERENCE FIG. 17 | SEQUENCE |
|---|---|---|---|
| 'A' | A | b<br>b<br>b<br>b<br>b<br>b<br>b<br>b<br>n | ↙ ↖ →<br>↙ ↖ ←<br>↙ ↘ →<br>↙ ↘ ←<br>↗ ↘ ←<br>↗ ↘ →<br>↗ ↖ ←<br>↗ ↖ →<br>← ↗ ↘ |
| 'B' | B | h<br>i | ↓ → ↓ ← ↓ ←<br>↑ → ↓ ← ↓ ← |
| 'C' | C | m | ← ↓ → |
| 'D' | D | h | ↓ → ↓ ← 212 |
| 'E' | E | e<br>e<br>e<br>e<br>e<br>e<br>e<br>e<br>p<br>l<br>l | ↓ → → →<br>↓ → → ←<br>↓ → ← →<br>↓ → ← ←<br>↓ ← → →<br>↓ ← → ←<br>↓ ← ← →<br>↓ ← ← ←<br>→ ↓ ← →<br>← ↓ ← →<br>← ↓ ← ← |
| 'F' | F | d<br>d | ↓ H↑M → → 210<br>↓ H↑M → ← |
| 'G' | G | k | ↑ ← ↓ → ↑ ← |
| 'H' | H | k<br>c<br>e<br>e | ↑ ← ↑<br>↓ ↓ →<br>↓ → ↑<br>↓ ← ↑ |
| 'I' | I | d<br>d<br>k | ↓ H↖M → → 208<br>↓ H↖M → ←<br>↑ ← → |
| 'J' | J | l | ← ↓ ← |
| 'K' | K | d<br>d<br>d<br>d | ↓ ↙ ↘<br>↓ ↙ ↖<br>↓ ↗ ↘<br>↓ ↗ ↖ |
| 'L' | L | f<br>f | ↓ → ← 216<br>↓ ← |
| 'M' | M | c<br>c | ↓ ↘ ↗ ↓<br>↓ ↘ ↙ ↓ |
| 'N' | N | c | ↓ ↘ ↑ |
| 'O' | O | q<br>m<br>i | ↓ → ↑ ←<br>← ↓ → ↑<br>↑ → ↓ ← |
| 'P' | P | h | ↓ → ↓ ← 214 |

FIG. 15b

| CHARACTER NORMAL | CHARACTER IDENT | SCHEMATIC REFERENCE FIG. 17 | SEQUENCE |
|---|---|---|---|
| 'Q' | Q | n<br>p<br>p<br>l<br>l | ← ↓ → ↑ ↘ ←200<br>→ ↓ ← ↑ ↖<br>→ ↓ ← ↑ ↘<br>← ↓ ← ↑ ↘<br>← ↓ ← ↑ ↖ |
| 'R' | R | j<br>j<br>h | ↑ → ↓ ← ↖ ←202<br>↑ → ↓ ← ↘<br>↓ → ↓ ← ↘ |
| 'S' | S | k | ↑ ← ↓ → ↓ ← ↑ |
| 'T' | T | f<br>f | ↓ → 218<br>↓ ← |
| 'U' | U | g<br>g<br>g | ↓ ↑ ←<br>↓ ↑ →<br>↓ → ↑ |
| 'V' | V | o | ↘ ↗ ←204 |
| 'W' | W | o | ↘ ↗ ↘ ↗ |
| 'X' | X | o<br>o | ↘ HM ↗ ←206<br>↘ HM ↙ |
| 'Y' | Y | o | ↘ ↗ ↓ |
| 'Ƶ' | Ƶ | n<br>n<br>p<br>p | ← ↙ → →<br>← ↙ → ←<br>→ ↙ → →<br>→ ↙ → ← |
| '1' | \|<br>/ | i<br>c<br>b<br>b | ↑<br>↓<br>↗<br>↙ |
| '2' | Z | p<br>n | → ↙ →<br>← ↙ → |
| '3' | 3 | l<br>p | ← ↓ ← ↓ ←<br>→ ↓ ← ↓ ← |
| '4' | 4 | e<br>e | ↓ → ↓<br>↓ ← ↓ |
| '5' | 5 | m | ← ↓ → ↓ ← |
| '6' | 6 | m | ← ↓ → ↑ ← |
| '7' | 7 | i | ↑ → ↙ |
| '8' | 8 | i | ↑ → ↓ ← ↓ → ↑ |
| '9' | 9 | m | ← ↓ → ↓ |
| 'Ø' | Ø | j<br>j | ↑ → ↓ ← ↙<br>↑ → ↓ ← ↗ |
| SPACE | | j | EOC EOC |

Aug. 3, 1965 J. E. GAFFNEY, JR., ETAL 3,199,078

CHARACTER IDENTIFICATION DEVICE

Filed Feb. 5, 1960 28 Sheets-Sheet 11

Aug. 3, 1965 J. E. GAFFNEY, JR., ETAL 3,199,078

CHARACTER IDENTIFICATION DEVICE

Filed Feb. 5, 1960 28 Sheets-Sheet 17

CHARACTER IDENTIFICATION DEVICE

Filed Feb. 5, 1960 28 Sheets-Sheet 18

CHARACTER IDENTIFICATION DEVICE

Filed Feb. 5, 1960

United States Patent Office 3,199,078
Patented Aug. 3, 1965

3,199,078

CHARACTER IDENTIFICATION DEVICE

John E. Gaffney, Jr., Poughkeepsie, and Arthur A. Kusnick, Peekskill, N.Y., assignors to International Business Machines Corporation, New York, N.Y., a corporation of New York Filed Feb. 5, 1960, Ser. No. 6,938
24 Claims. (Cl. 340—146.3)

This invention relates to handwritten material identification devices, and in particular, to devices for identifying handwritten material while it is being written.

There are previous devices which are capable of reproducing handwritten material without identification of the character written. There are also previous devices capable of identifying handprinted material after the printing is finished. Some prior devices can identify the character as it is being printed if a specially constructed writing surface is provided. These devices require the user to draw each character according to a relatively rigid set of standards.

The primary object of the present invention is to provide identification of handwritten material as the characters are being written.

A further object is to enable character identification without requiring a special drawing surface.

Another object is to provide identification of characters written with relaxed requirements as to character height, width, shape, and registration.

These objects are achieved by converting the character into electrical signals indicative of the directions of movement of the tracing device, and then decoding the electrical signals to determine which of the unique set of characters has been traced. One embodiment requires that each character to be identified comprises strokes differing in either number or direction from all other recognizable characters. A preferred embodiment enables a lower standard of character conformity by the user by making use of "hidden movements" (those movements made when the tracing device is not touching the writing surface), the relative positions of the character strokes with respect to each other, and the sequence and direction of the strokes comprising the character. In all embodiments, character identification is independent of the size of the character and its registration (position on the writing surface).

The foregoing and other objects, features and advantages of the invention will be apparent from the following more particular description of embodiments of the invention, as illustrated in the accompanying drawings.

FIG. 3 is a chart providing data for a sample set of characters that may be used in connection with the embodiment shown in FIG. 1.

Figures 1, 2:
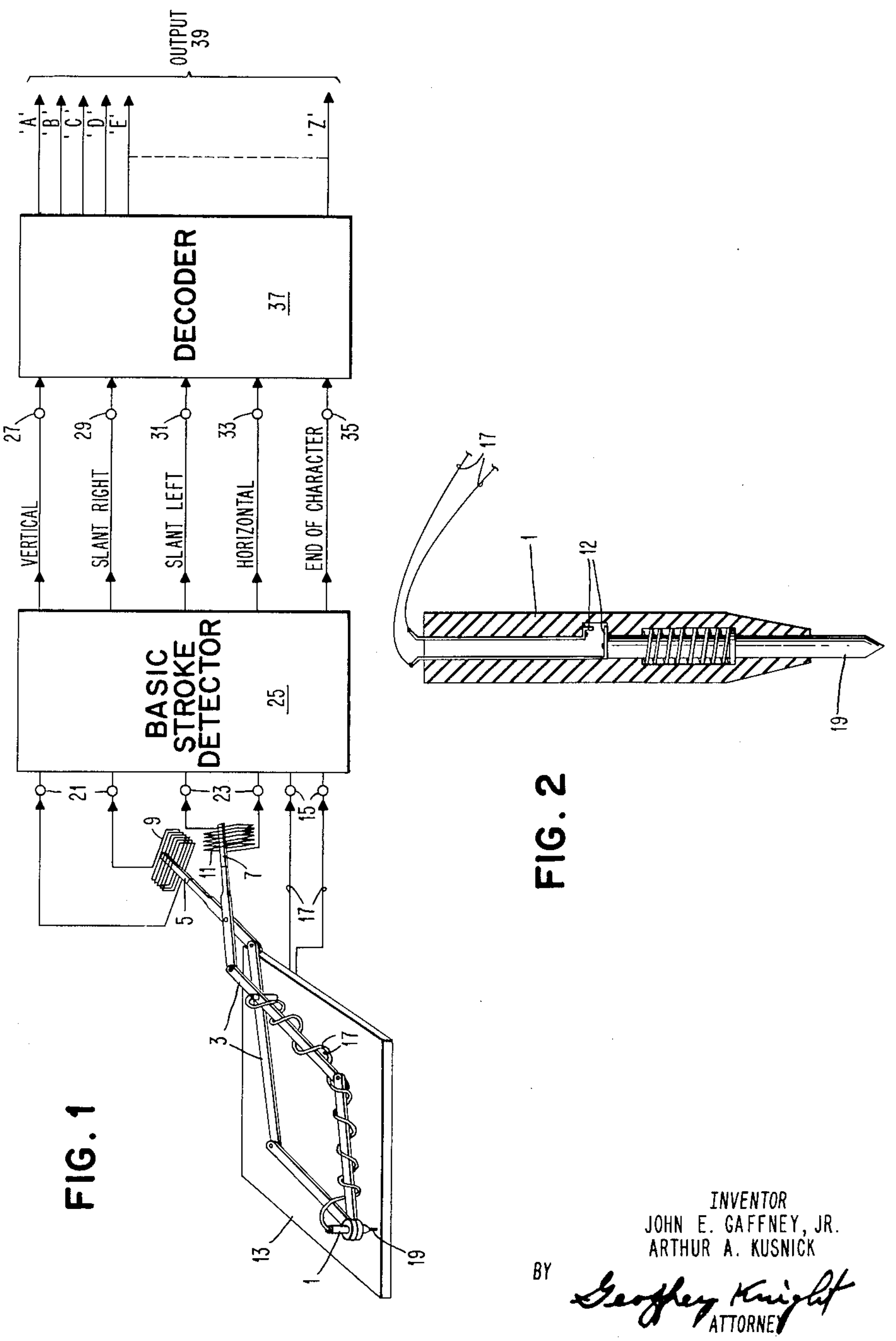
FIG. 1 is a diagram of a basic embodiment, including a detailed view of the input tracing element and transducer.
FIG. 2 is a cutaway view of a tracing element.
Figure 13A:
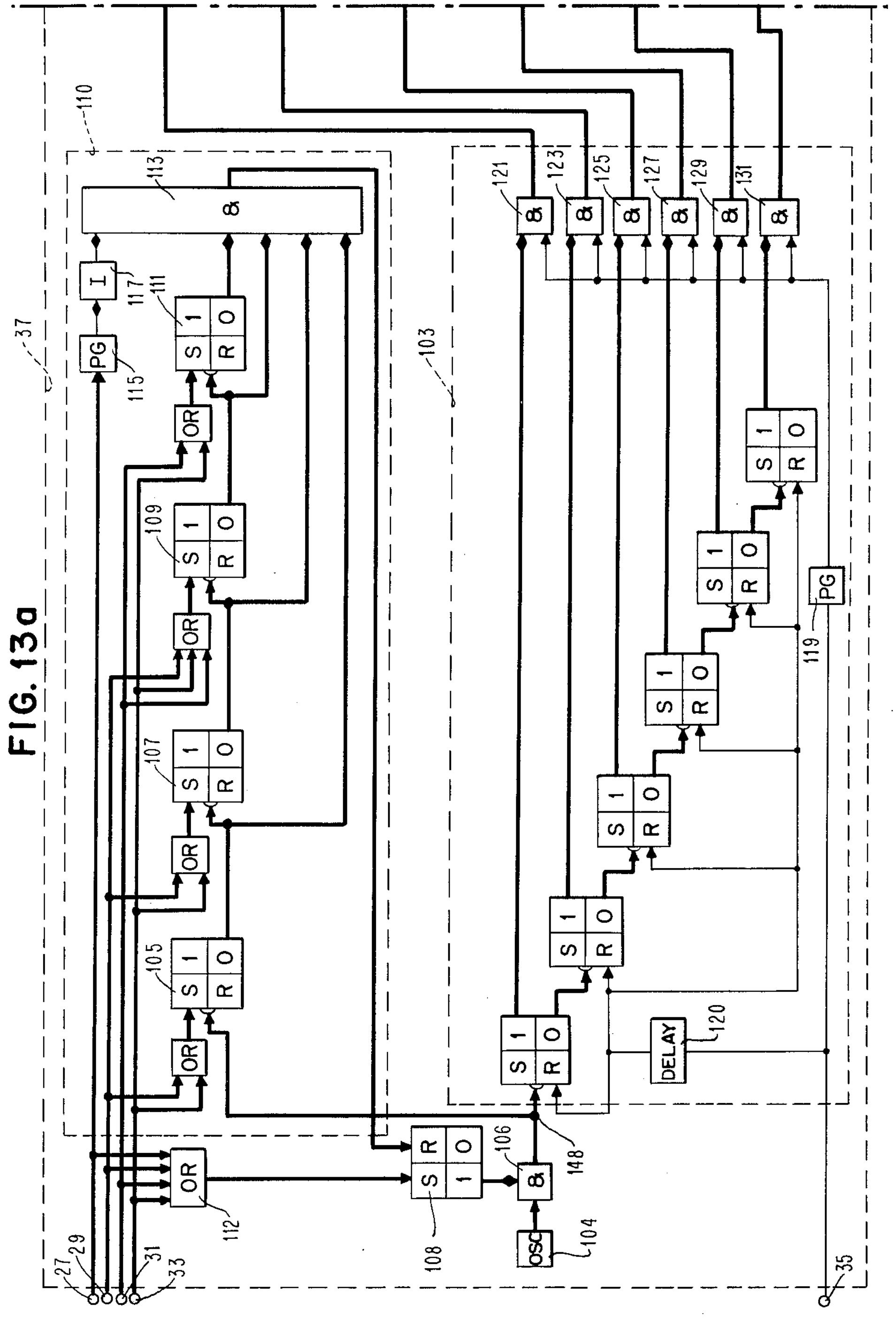
Figure 13B:
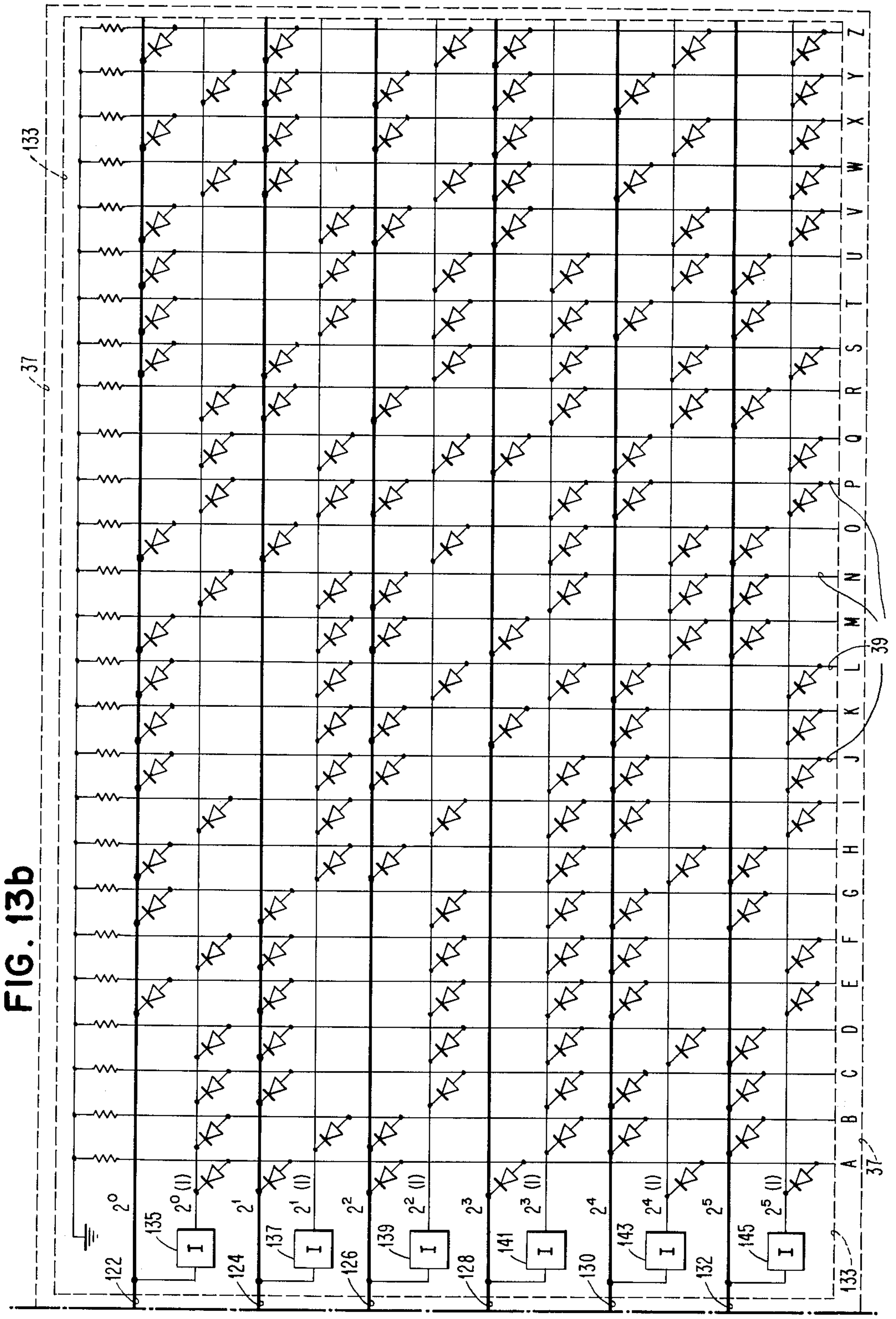

FIG. 13*a–b* is a schematic diagram of an electronic decoder that may be used in the embodiment shown in FIG. 1.

Figure 14:
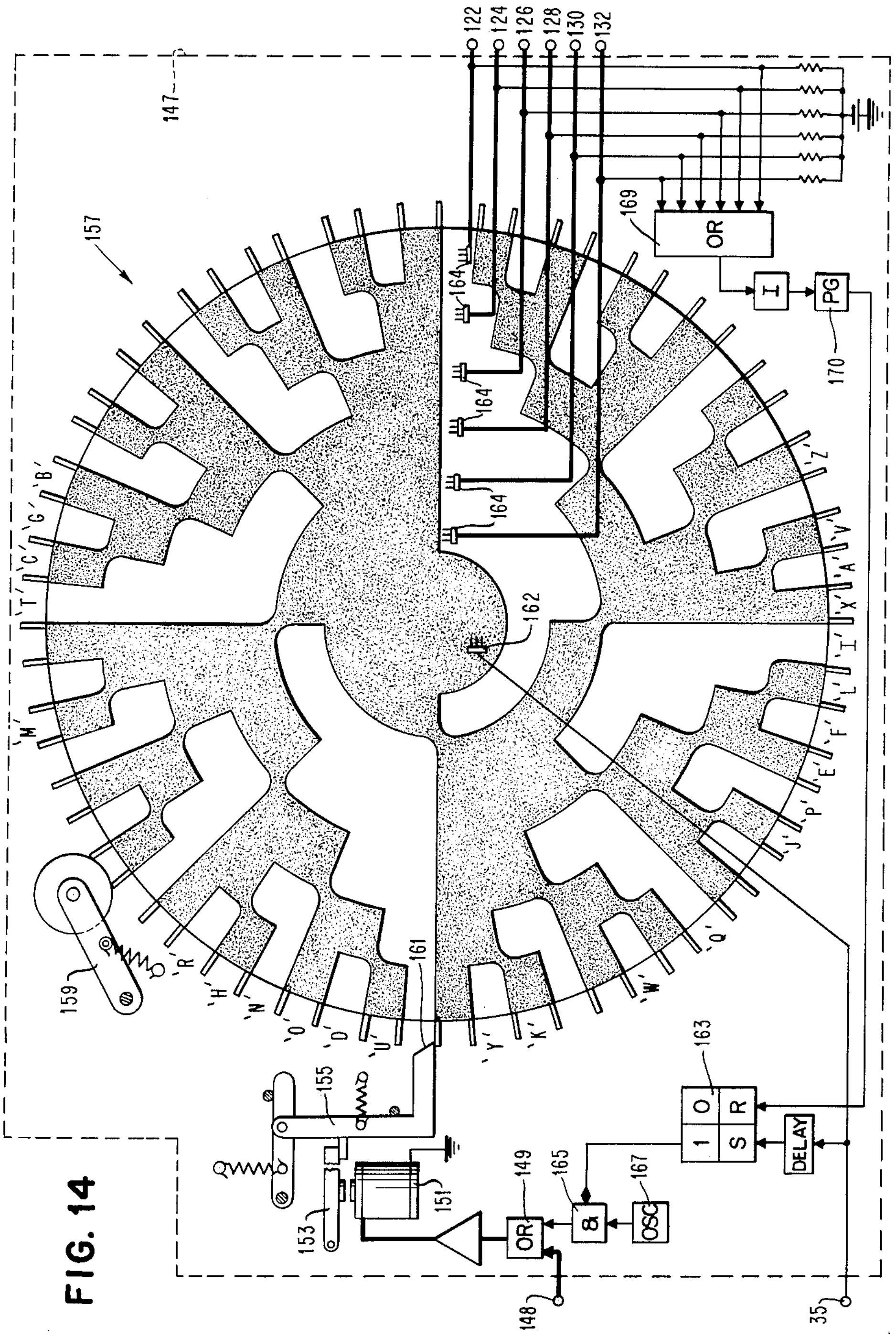

FIG. 14 is a diagram of an electromechanical device which may be substituted for a portion of the electronic decoder shown in FIG. 6*a*.

FIG. 15*a–b* is a chart showing a sample set of characters that may be used in connection with a preferred embodiment.

Figure 16:
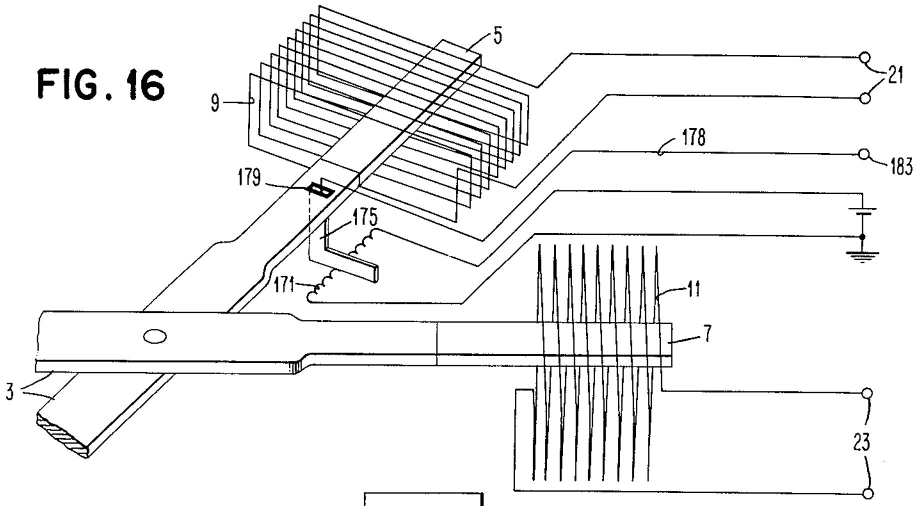

FIG. 16 is a detailed view of part of an input transducer that may be used with a preferred embodiment.

Figure 17:
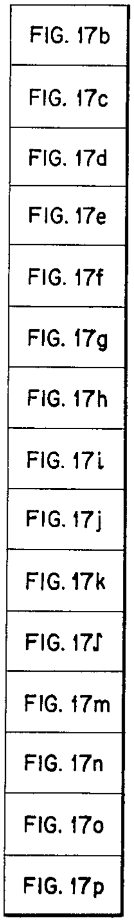
Figure 17A:
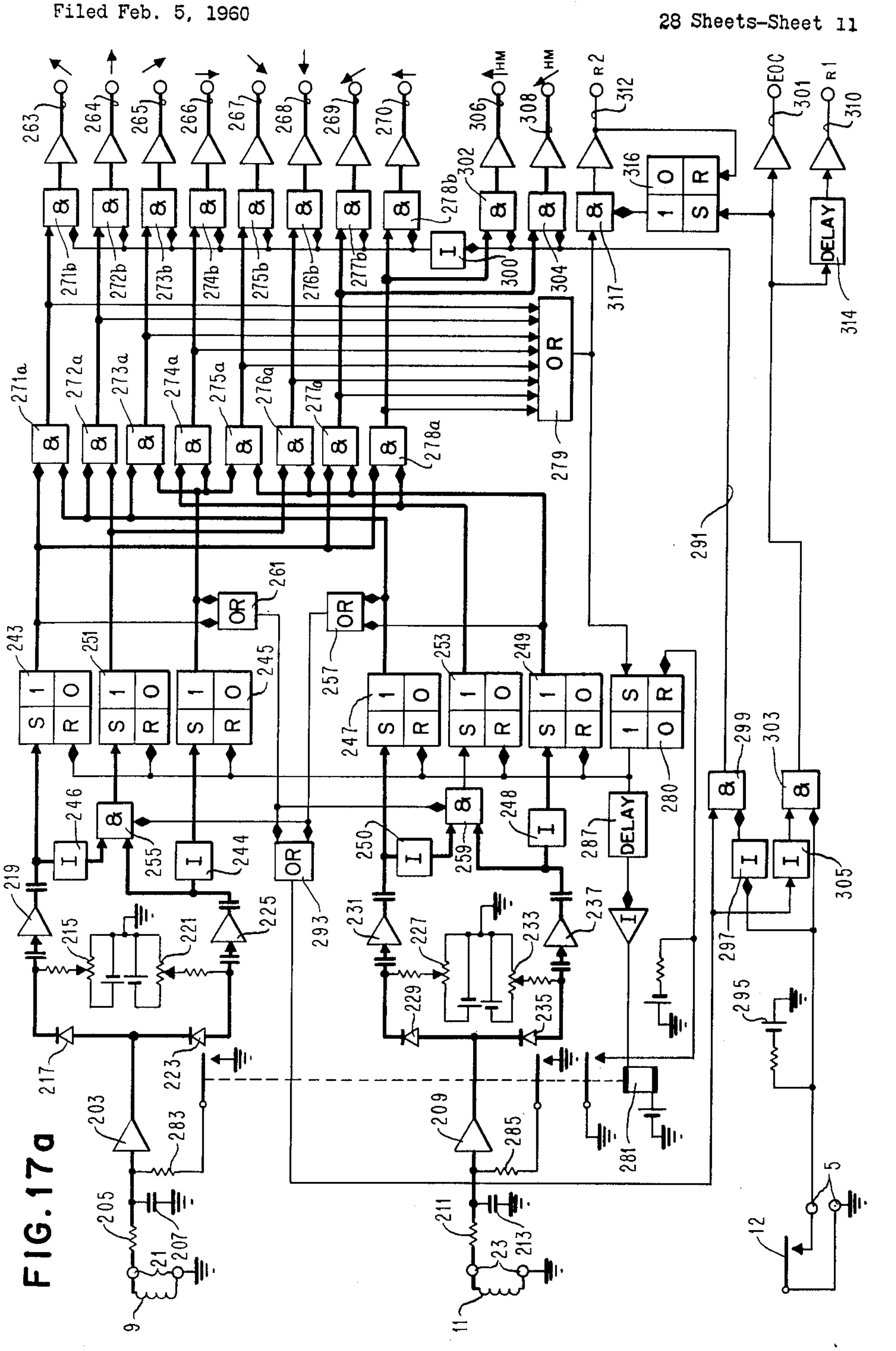
Figure 17B:
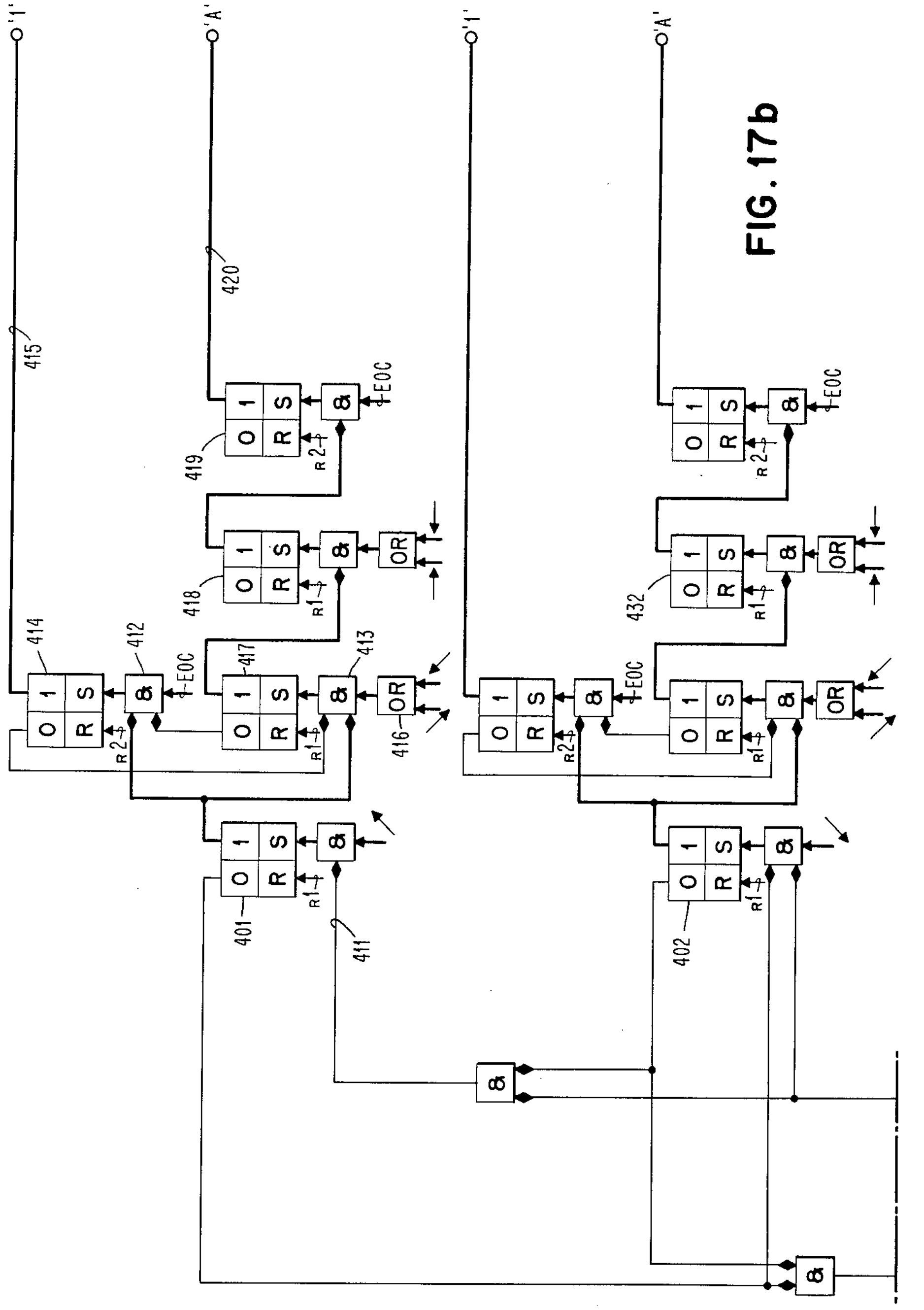
Figure 17C:
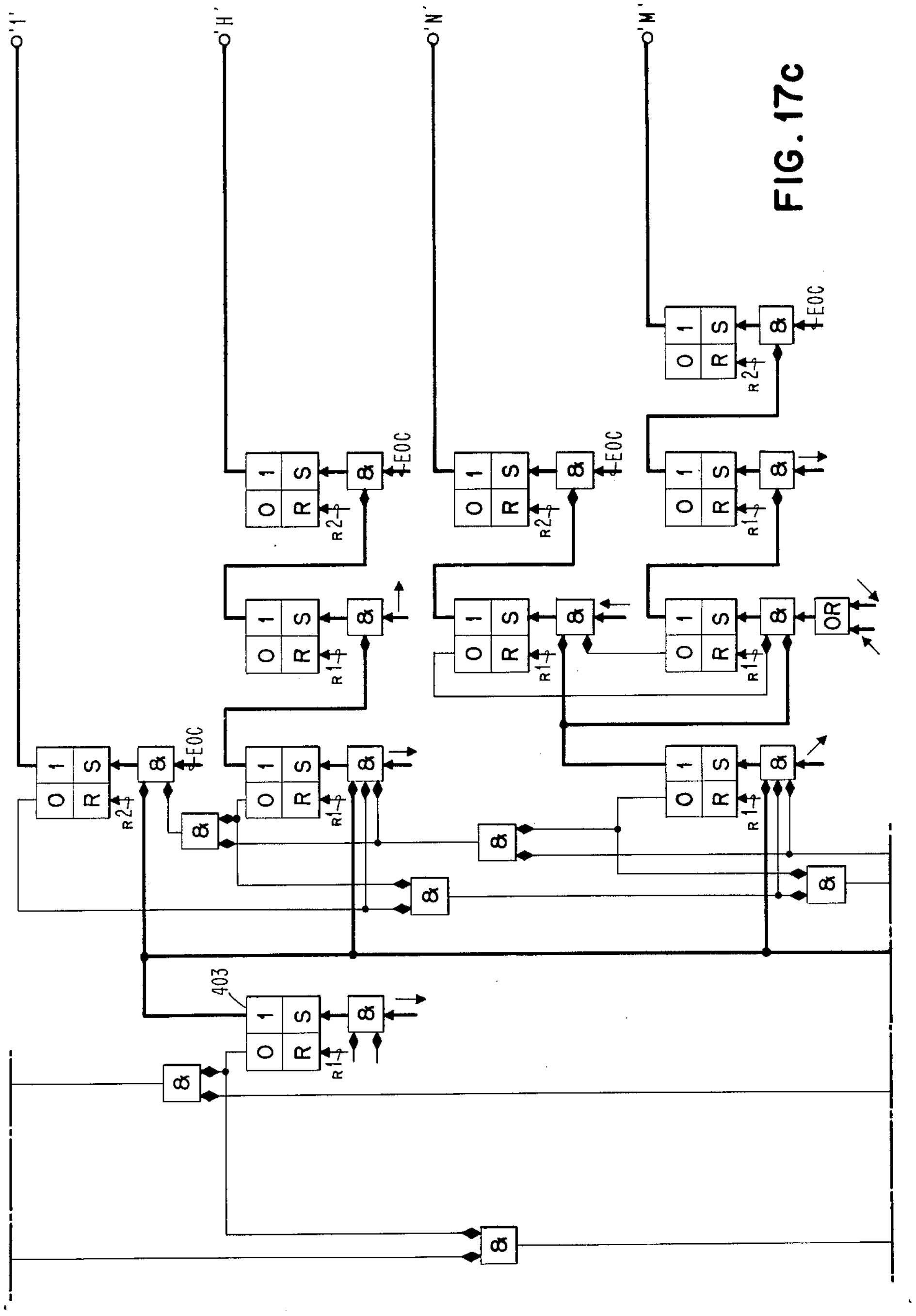
Figure 17D:
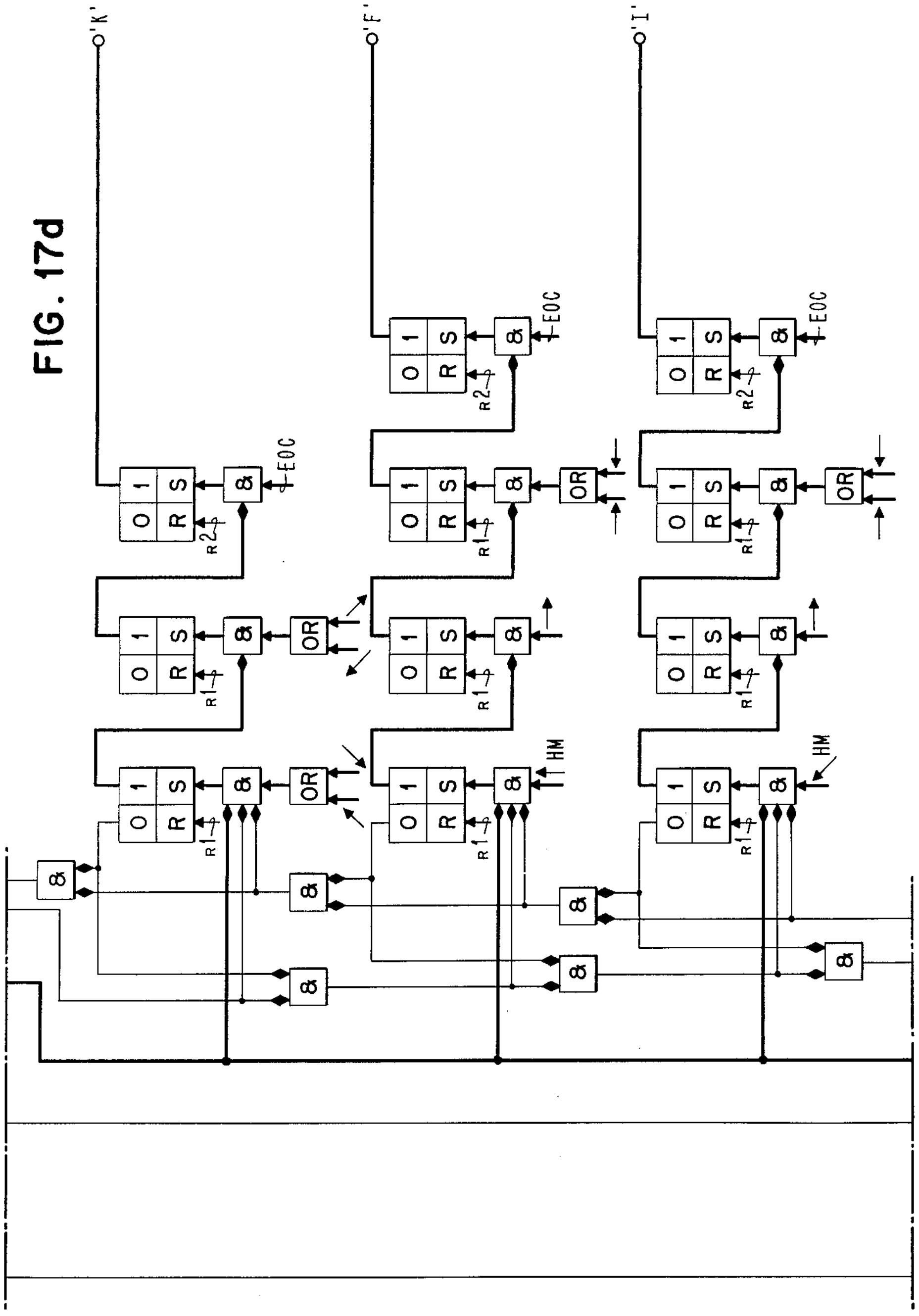
Figure 17E:
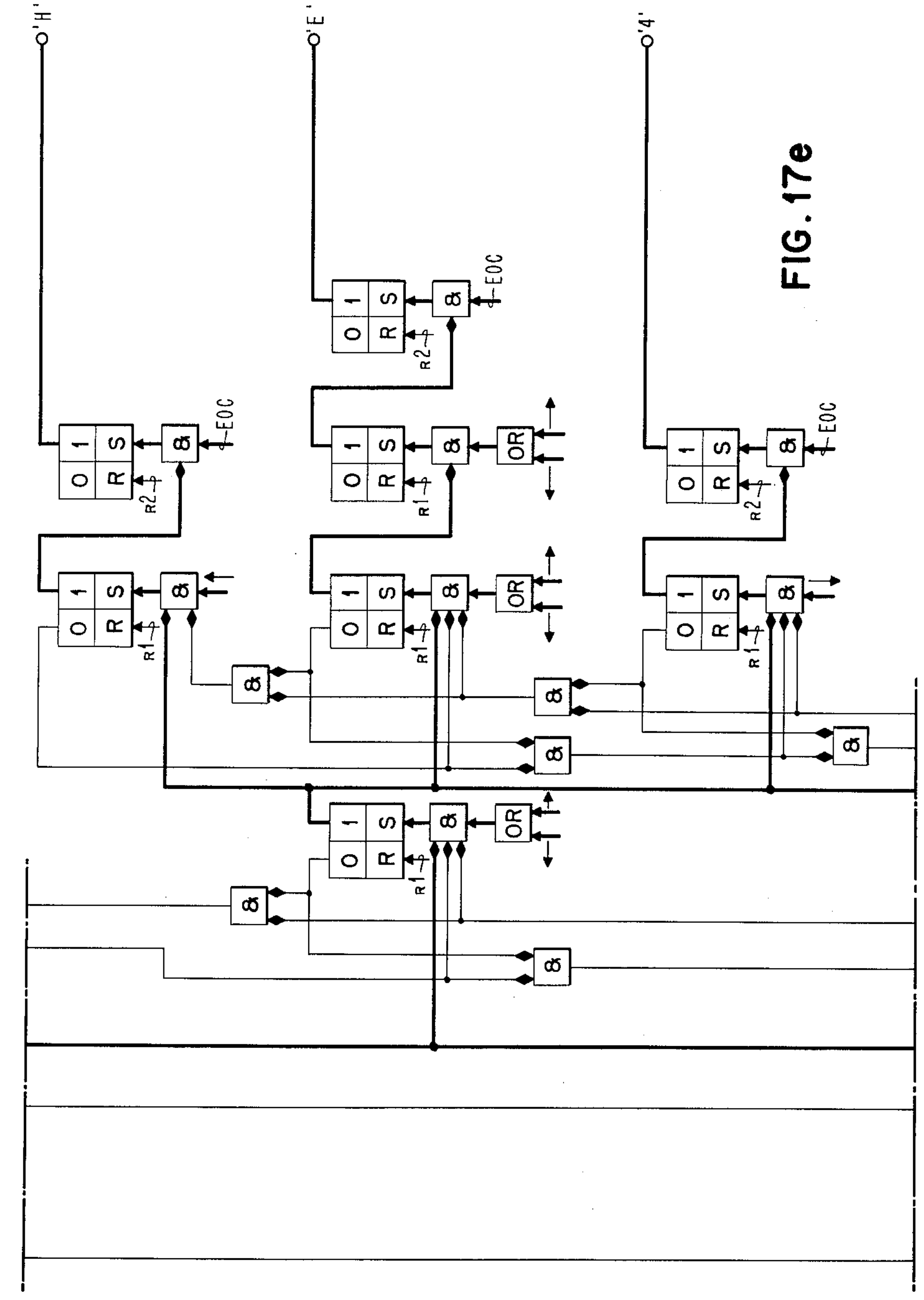
Figure 17F:
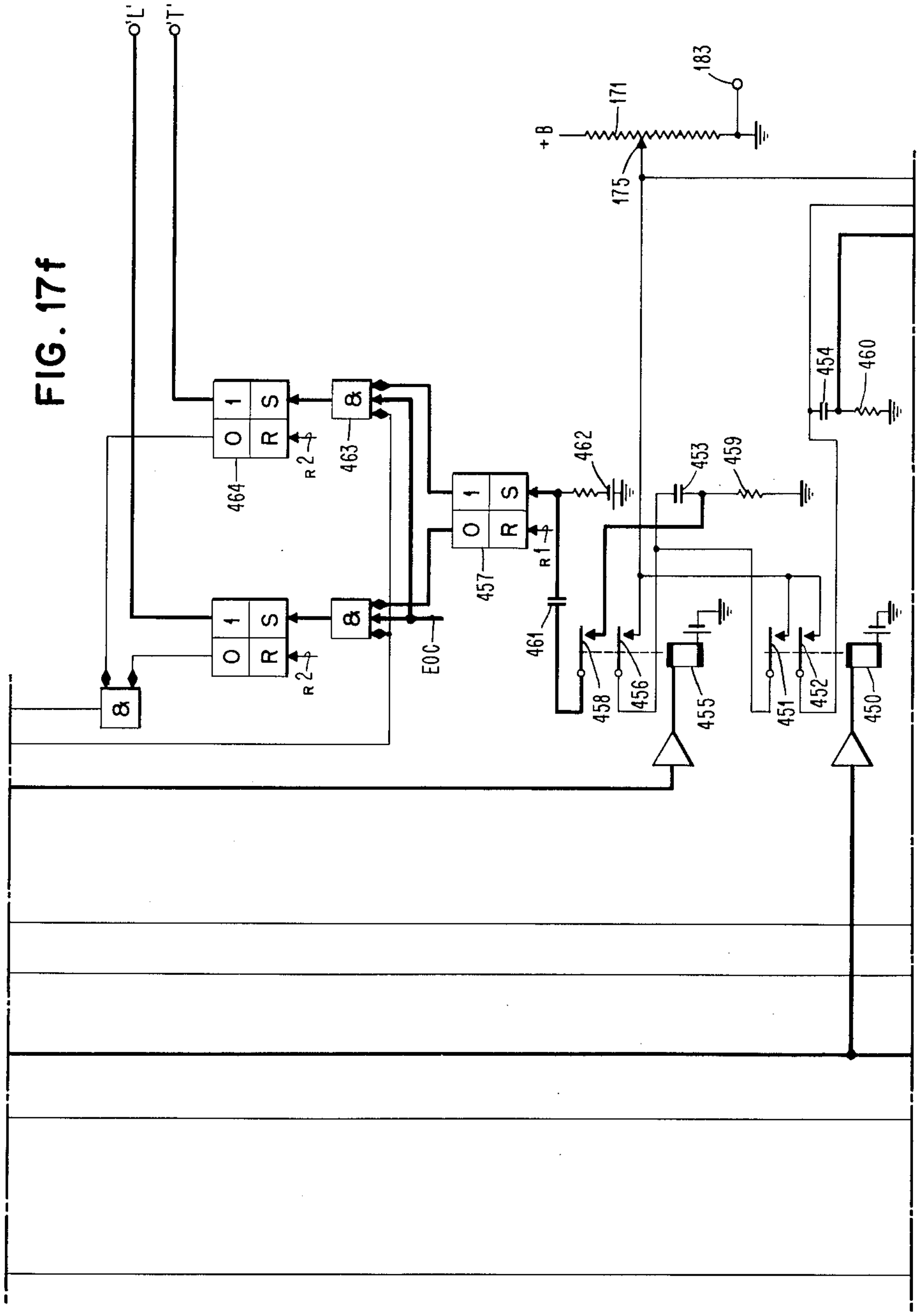
Figure 17G:
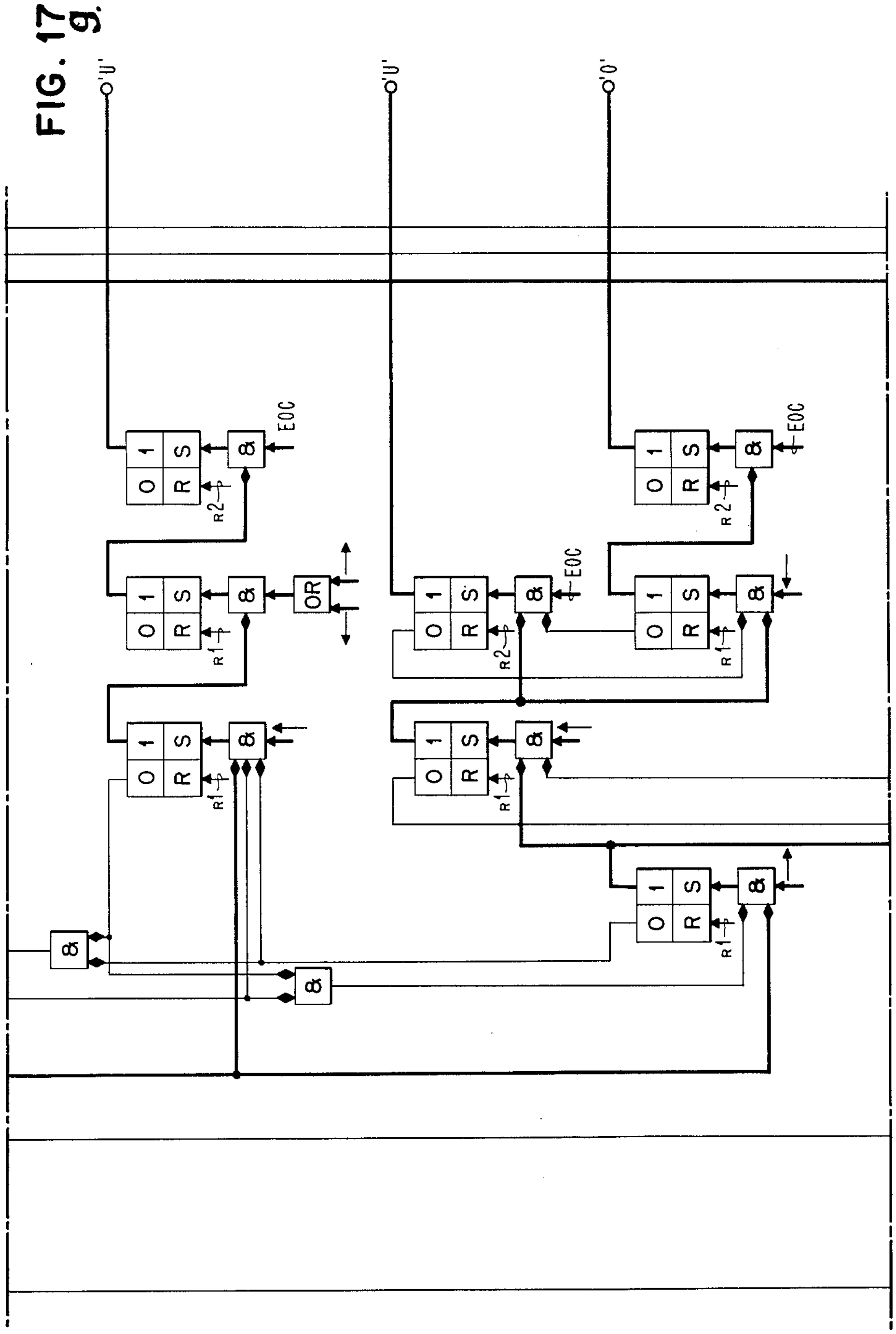
Figure 17H:
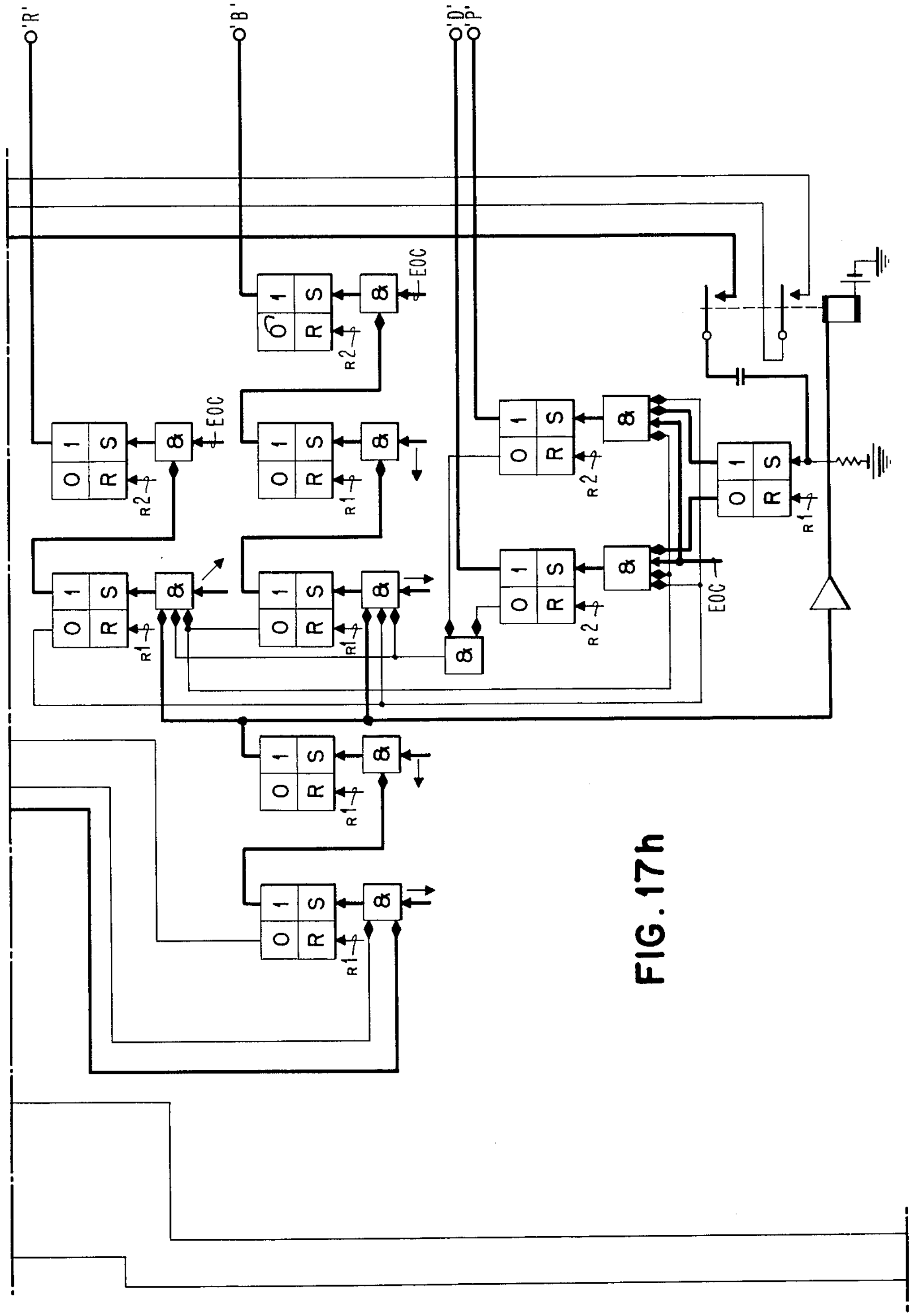
Figure 17I:
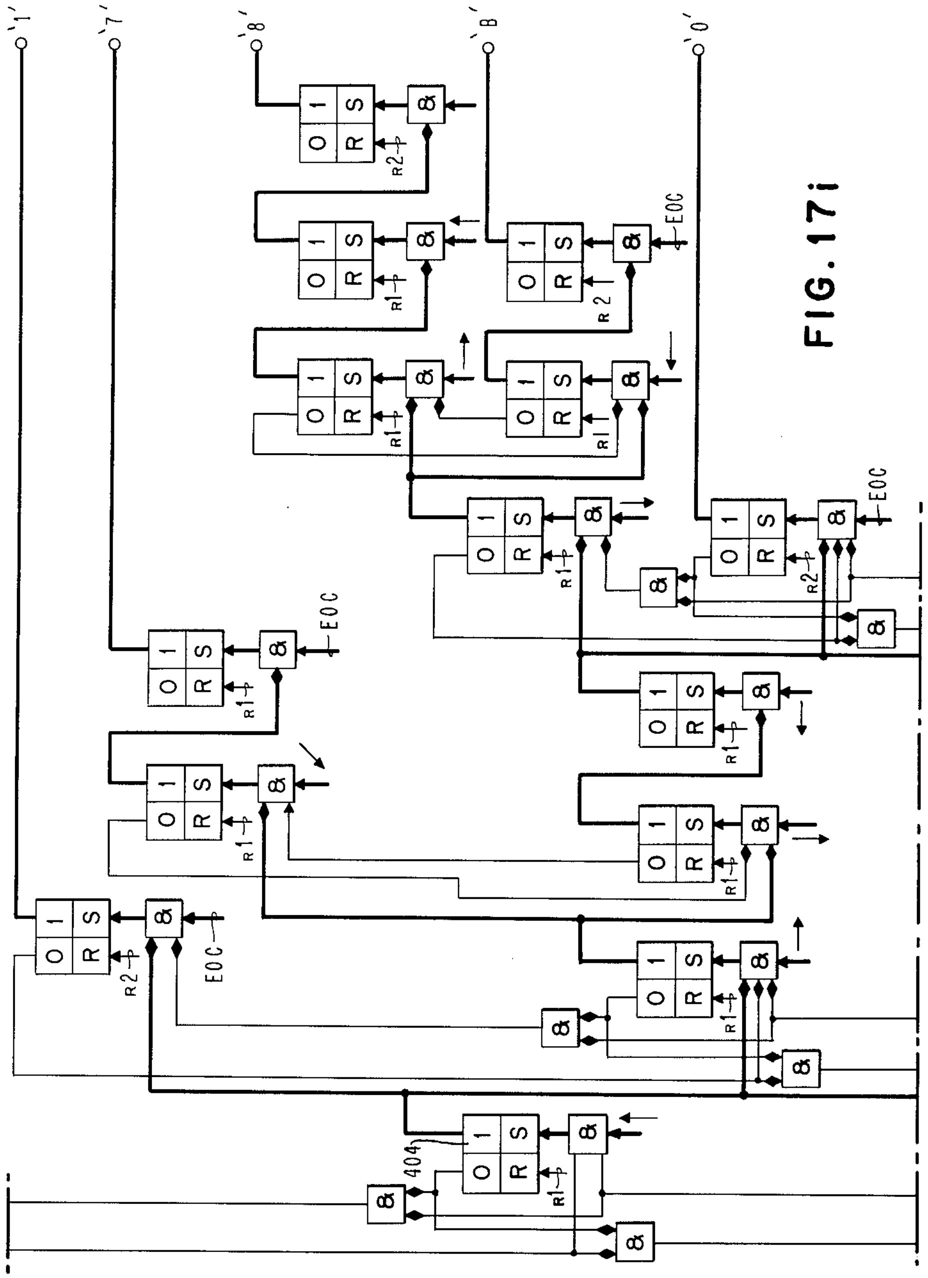
Figure 17J:
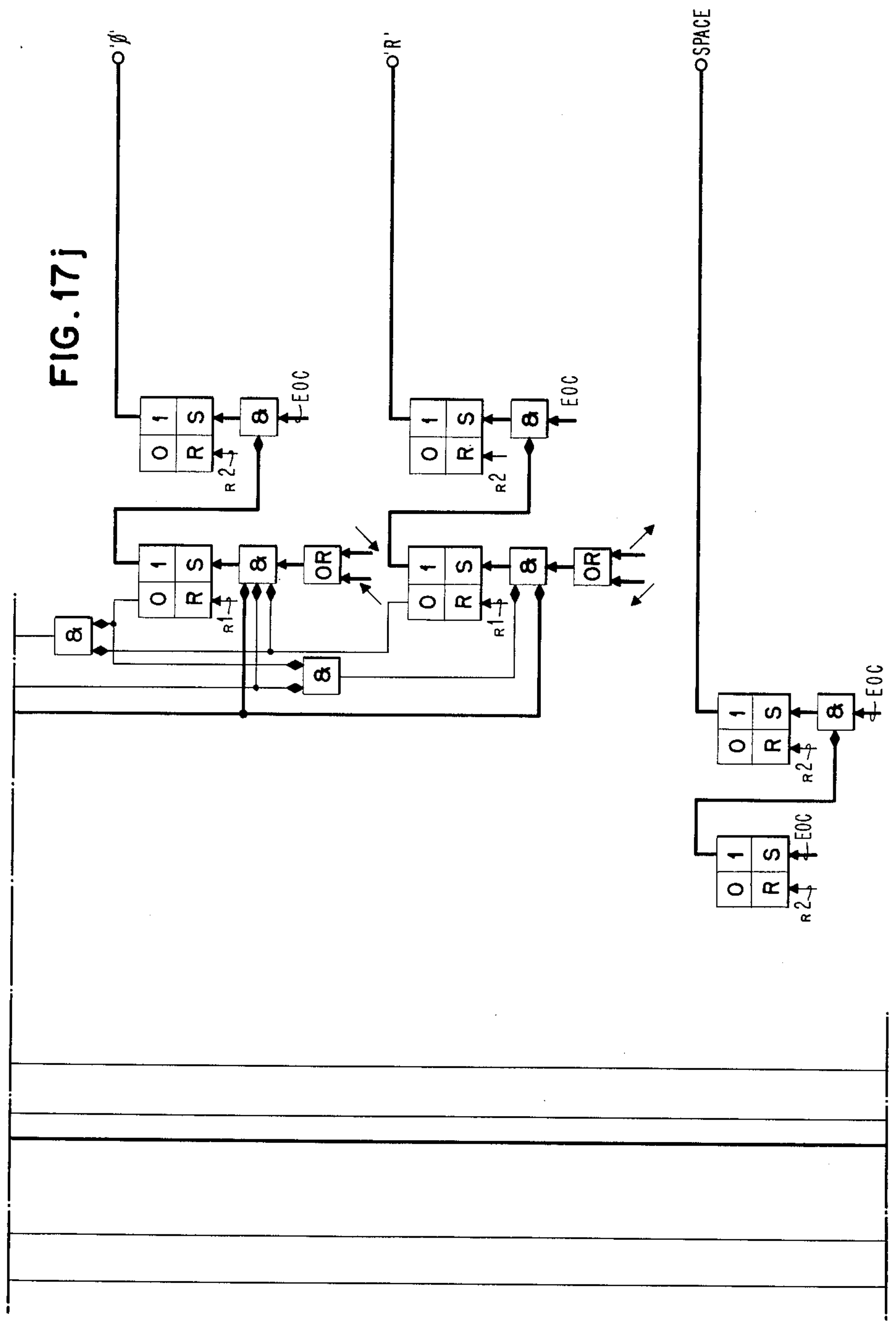
Figure 17K:
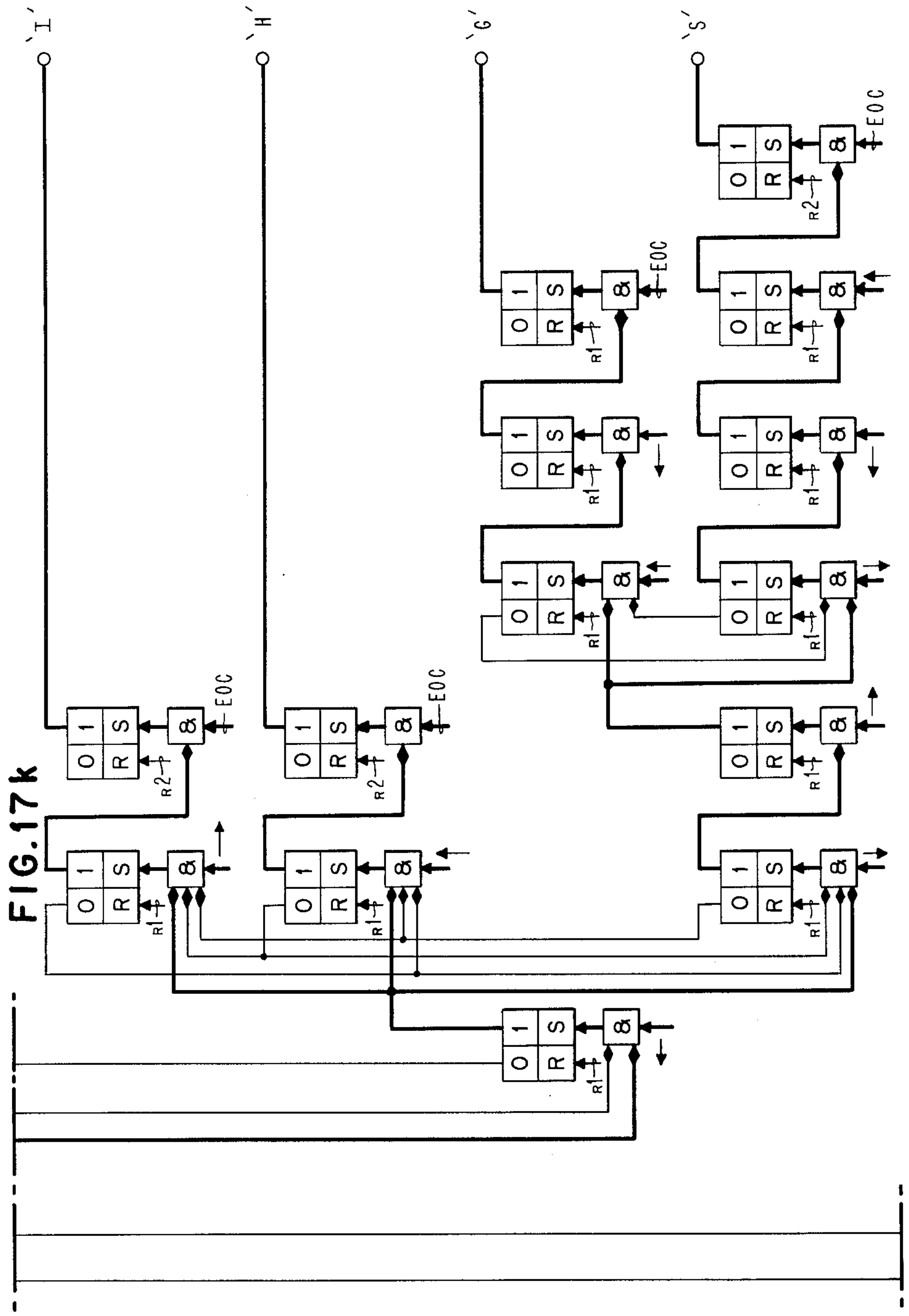
Figure 17J:
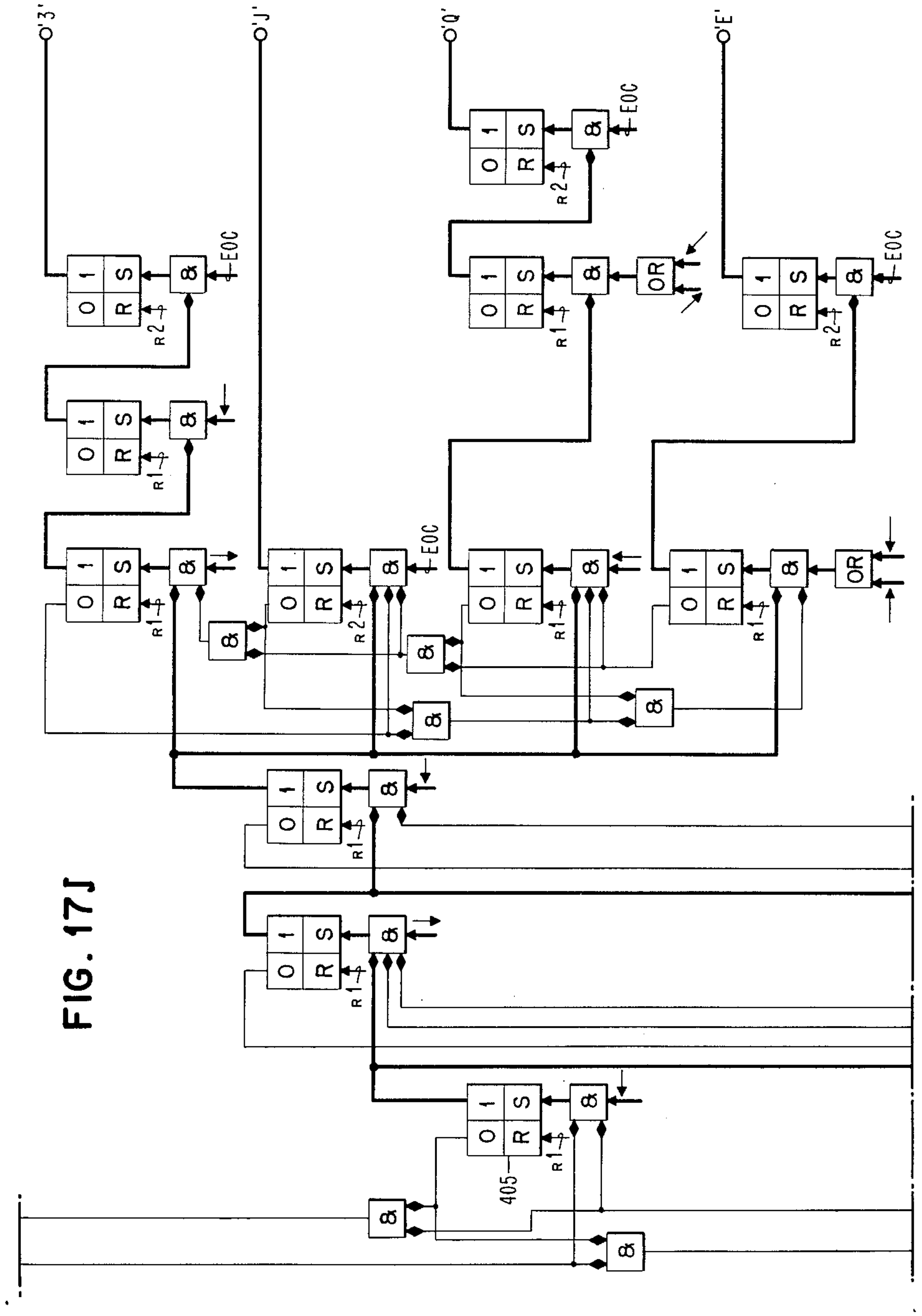
Figure 17M:
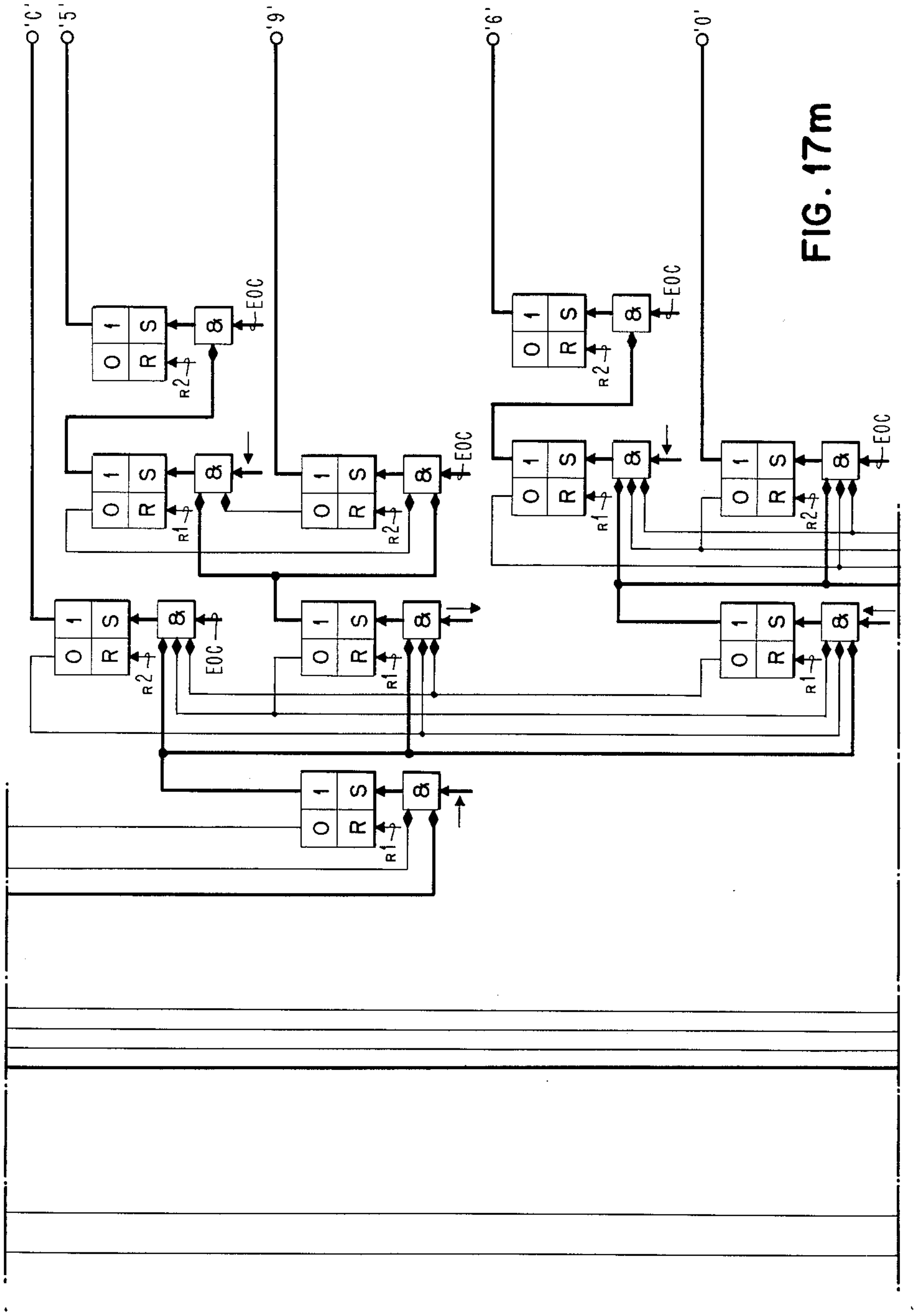
Figure 17N:
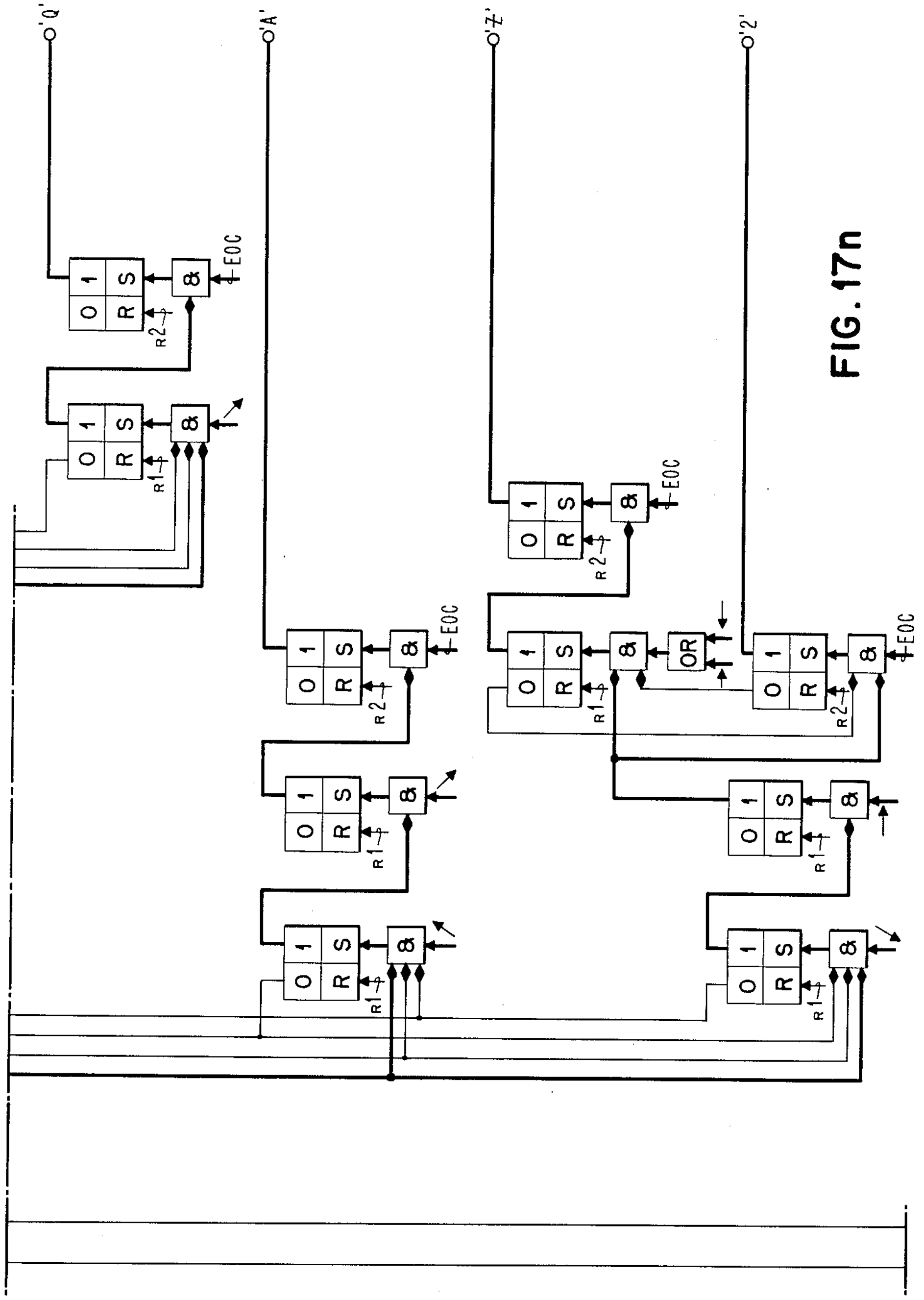
Figure 17O:
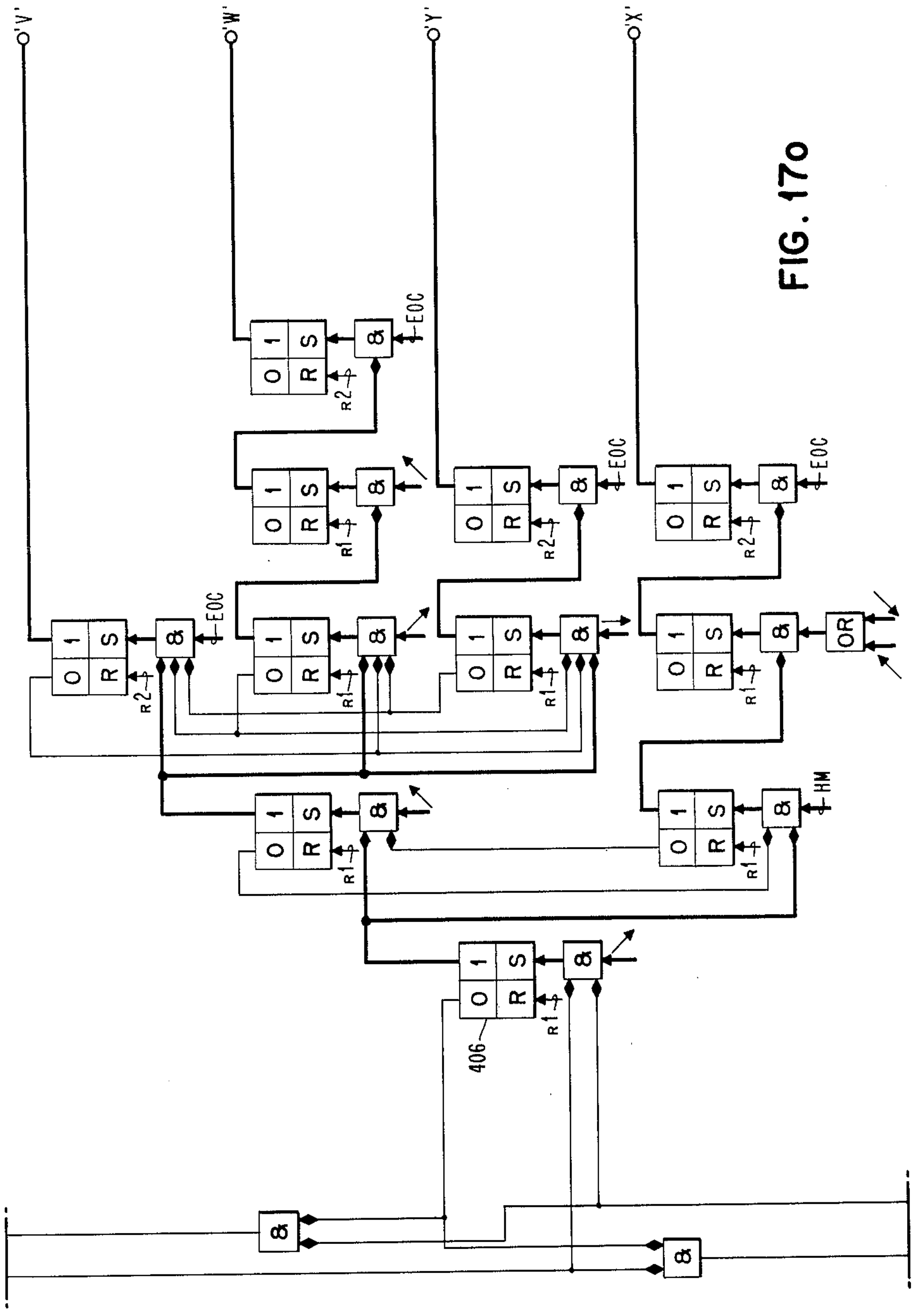
Figure 17P:
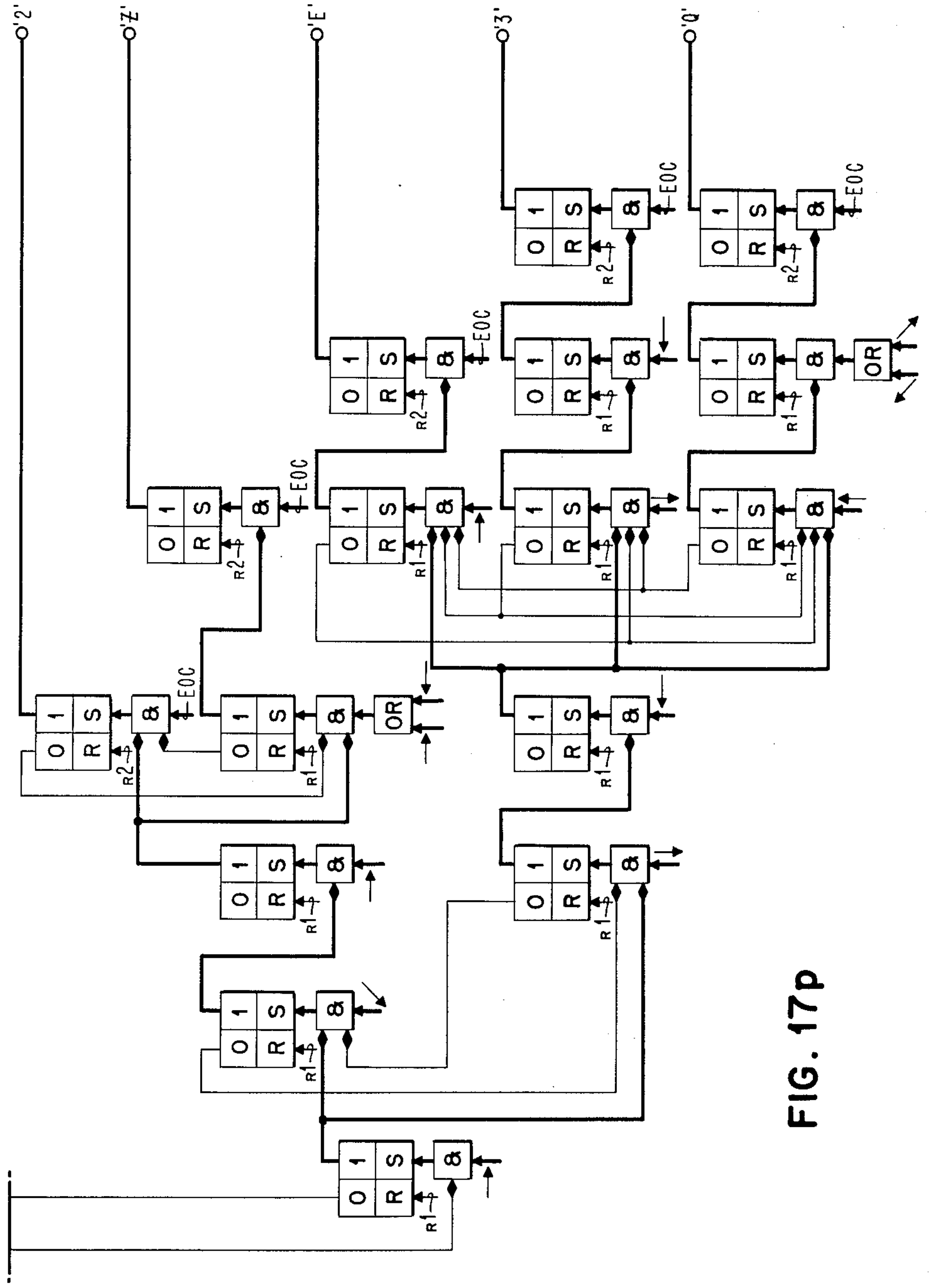

FIG. 17 is a diagram showing the arrangements of FIGS. 17*b–p*.

Figure 17Q:
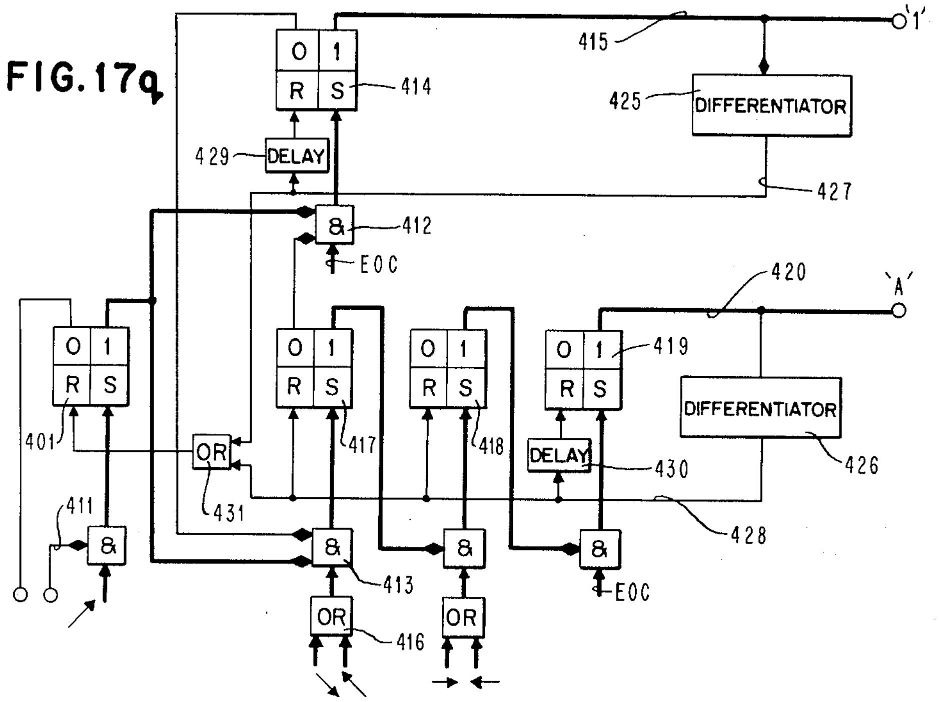
Figure 17R:
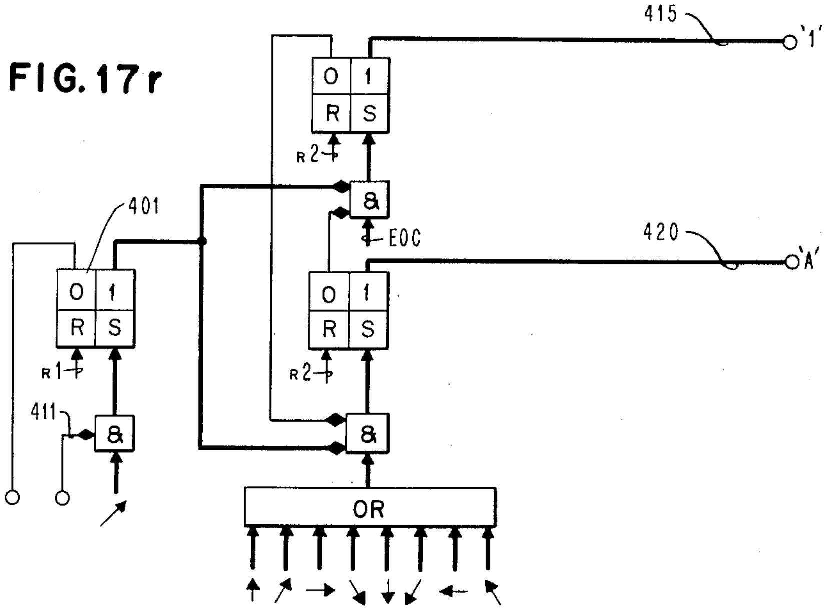
Figure 17S:
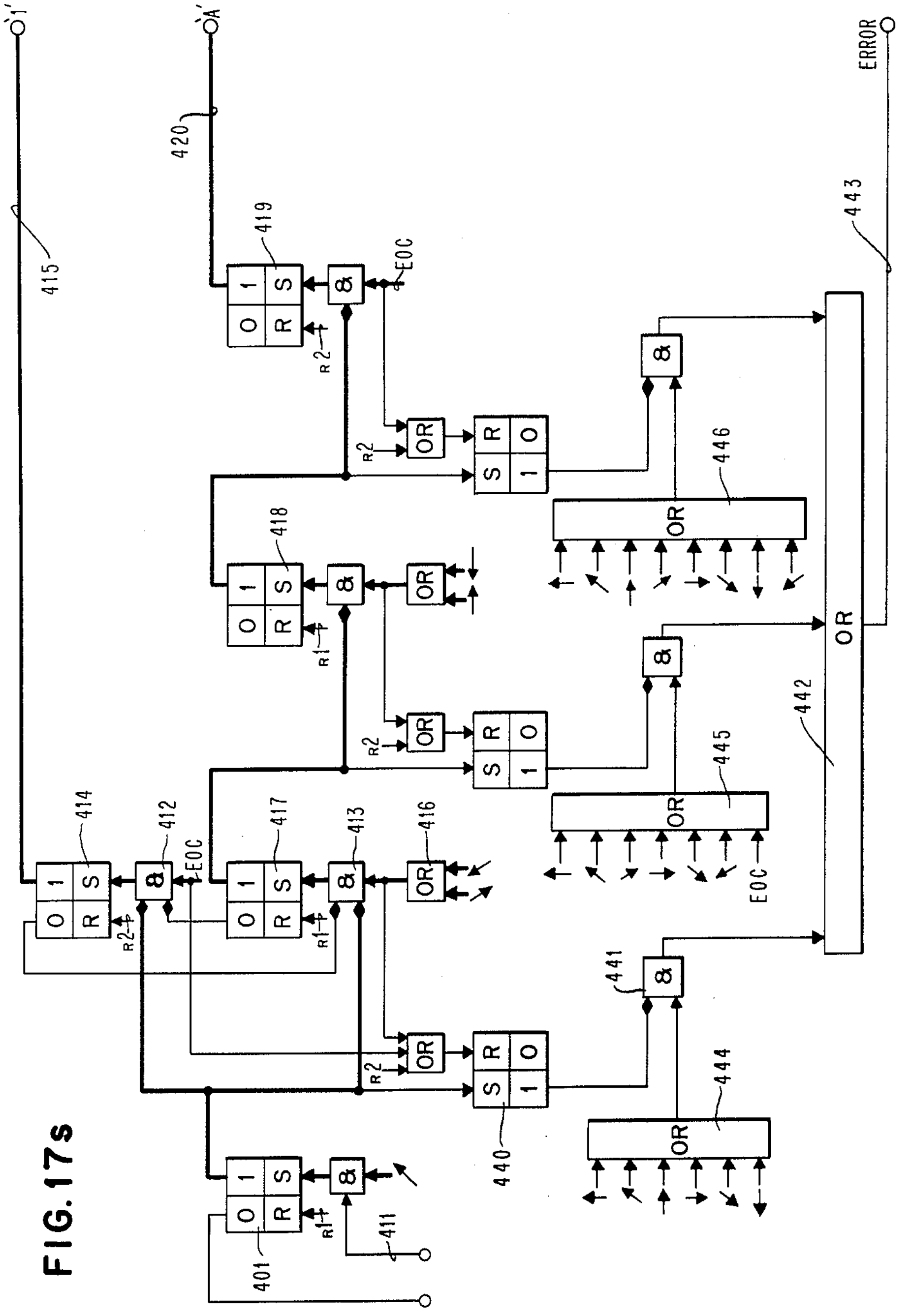

FIG. 17*a–s* is a schematic diagram of a preferred embodiment.

FIG. 1 shows the input transducer of a basic embodiment and its relationship to the detector and decoder. A tracing element in the form of a stylus 1 controls a pantograph 3 which, in turn, positions magnets 5 and 7 located in pickup coils 9 and 11, respectively. Movement of the magnets induces a voltage in the associated pickup coil; if the stylus 1 is moved in the horizontal direction, the horizontal magnet 7 will be caused to move within the horizontal pickup coil 11, in a direction to induce a voltage in the coil proportional to the speed of movement of the stylus. During horizontal strokes, movement of the vertical magnet 5 is in a direction which induces no voltage in the vertical pickup coil 9. Similarly, if the stylus 1 is moved in the vertical direction, a voltage will be induced in the vertical pickup coil 9 by the movement of the vertical magnet 5 and no voltage will be induced in the horizontal pickup coil 11. If the stylus is moved in a direction having both horizontal and vertical components, magnets 5 and 7 will be moved in a direction to induce a voltage in both pickup coils; the voltage in the vertical pickup coil 9 is proportional to the vertical component of movement and the voltage in the horizontal pickup coil 11 is proportional to the horizontal components of movement.

As shown in FIG. 2, in cutaway view, switch 12 located in the stylus 1 senses whether the stylus is touching surface 13 (FIG. 1). This switch 12 provides a continuous path between output terminals 15 through the connecting wires 17 when the stylus is touching the surface 13. The stylus 1 may also contain a writing element 19 to cause the surface 13 to be marked as the stylus is moved when tracing a character. A form may be affixed to the surface if desired.

The outputs of the transducer are applied through vertical output terminals 21, horizontal output terminals 23, and the on-surface terminals 15 previously mentioned, to basic stroke detector circuit 25. This circuit develops four basic stroke outputs: vertical, slant right, slant left, and horizontal, at terminals 27, 29, 31 and 33, respectively, from the vertical and horizontal inputs. The detector 25 operates only on the signals present while the stylus 1 is touching the writing surface 13. Hidden motions are not utilized in this embodiment.

The stylus must be touched to the writing surface (without being moved laterally) at the termination of each character. The detector 25 senses this on-surface condition with no horizontal or vertical motion and generates an "end of character" output 35.

A decoder 37 determines the number of strokes in each of the four basic directions between each pair of "end of character" signals and generates an output on leads 39. Each output lead represents one letter of the alphabet.

The decoder 37 detects the handwritten characters in in the following manner:

(a) Each of the four basic strokes is assigned a "weight."

(b) As each stroke is made, its weight is applied to an accumulator—thus, the total (or integrated) weight of the character is equal to the sum of the weights of the strokes comprising the character.

(c) The total character weight is compared to stored weights for the different characters to identify the character traced. In this description, "storage" not only includes the common forms of data storage, but refers to any device or circuit containing references to which comparison to the character traced can be made.

The basic embodiment can be used to recognize any system of characters if each character contains a different combination of basic strokes. The alphabet shown in FIG. 3 is an example of a system of characters that might be used. FIG. 3, column 2 shows a possible means of tracing each character so that each has a different stroke combination. The number of each of the basic strokes is indicated in the succeeding columns of the table. Each basic stroke is assigned a weight. In the example shown in FIG. 3, vertical strokes are given the weight 16; slant right strokes, the weight 9; slant left strokes, the weight 4; and horizontal strokes, the weight 1. The final column of FIG. 3, indicates the total character weights. Any weighting may be selected, provided that, under the weighting selected, each character has a different total weight. The stroke weights assigned were derived through experimentation; if a different set of characters were used, a method of obtaining stroke weights would be as follows:

(a) Select one of the four basic strokes and assign it the weight "1."

(b) Select a second basic stroke and assign it a weight equal to one greater than the largest number of strokes, of the type selected in step a, found in any character.

(c) Select a third basic stroke and assign it a weight equal to the product of the weight assigned in step b and one greater than the largest number of strokes, of the type selected in step b, found in any character.

(d) Assign the fourth basic stroke a weight equal to the product of the weight asigned in step c and one greater than the largest number of strokes, of the type selected in step c, found in any character.

Although this procedure may result in selecting stroke weights larger than necessary to avoid duplication of total character weights, it guarantees that each character will have a different total weight without experimentation.

FIGS. 4–11 indicate the basic digital symbols and circuits used in the schematic diagrams. The two binary conditions are labeled "1" and "0," where "1" indicates zero volts and "0" indicates a negative voltage.

Figure 4:
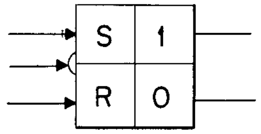
FIGS. 4–11 are diagrams showing the basic digital symbols and circuits used in the schematic diagrams.

FIG. 4 shows a basic bistable circuit, which is referred to as a flip-flop. The flip-flop is set by applying a "1" signal to the set (S) input. This provides a "1" signal at its "1" output and a "0" signal at its "0" output. The circuit is reset by applying a "1" signal to the reset (R) input, thus providing a "0" signal at the "1" output and a "1" signal at the "0" output. There is no effect on the circuit if an "S" input is applied when the circuit is already set or if an "R" input is applied when reset. The third input is called a "complement" input and operates to reverse the condition of the circuit when a "1" signal is applied. If the circuit were set before the application of a complement signal, it would be reset by the signal. Similarly, if the circuit were reset before the application of this signal, it would be set by the signal.

Figure 5:
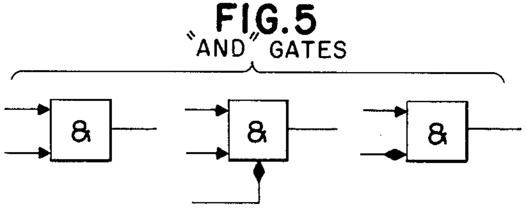
Figure 6:
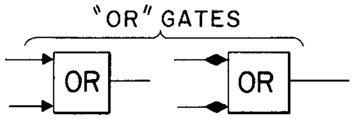

An "and" gate, as shown in FIG. 5, provides a "1" output if all inputs receive a "1" signal at the same time. Three types of "and" gates are shown. An "or" gate, as shown in the two symbols in FIG. 6, provides a "1" output if any "1" input is present. In all other cases, both the "and" gate and the "or" gate provide a "0" output.

Figure 7:
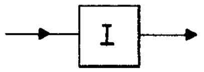
Figure 8:
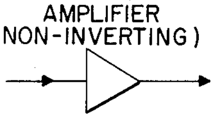
Figure 9:
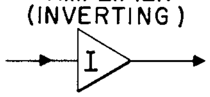

An inverter, as shown in FIG. 7, reverses the input. If a "1" is applied, a "0" is developed at the output; if a "0" is applied, a "1" is developed. An amplifier (FIG. 8) is presumed not to invert the input unless the letter "I" is placed in the triangle (FIG. 9).

The input leads to the digital circuits are terminated in either an arrow or a diamond. An arrow indicates that either a pulse or the leading edge of a gate signal produces the desired output. A diamond indicates that a gate signal is required—for example, when used in connection with an "and" gate, the diamond indicates the input to be a conditioning gate signal.

Figure 10:
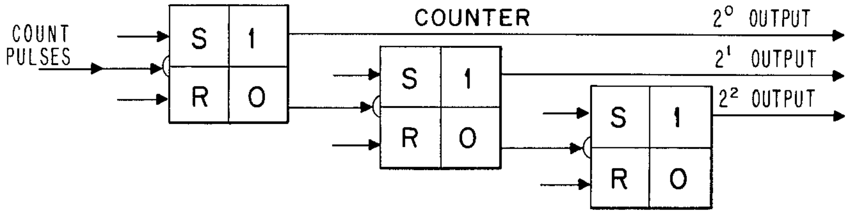

FIG. 10 shows a series of interconnected flip-flop circuits to form a part of an accumulator or counter. Count pulses are serially applied to the toggle input of the lowest order flip-flop. The output leads have signals indicative of the total count in the circuit. The counter may be reset (set to 0) by the application of "1" signals to all "R" inputs. This provides a "0" at each output lead. The first count pulse applied to the complement input sets the lowest order flip-flop, providing a "1" at its output lead. Since the "0" output of the lowest order flip-flop (connected to the second flip-flop) complement input is transferred from a "1" signal to a "0" signal, there is no effect on the second flip-flop. The second applied count pulse resets the lowest order flip-flop, providing a "0" signal at its output lead and a "1" signal to the second flip-flop, transferring its condition. At this time, the $2^0$ and the $2^2$ output leads contain "0" signals and the $2^1$ output lead contains a "1" signal, indicating a total count of 010, which is the binary representation for the decimal digit "2." As successive count pulses are applied, the output total increases, until a total of 111 is obtained (after the seventh input pulse). The next (eighth) count pulse applied causes an output total of 000, and succeeding pulses cause a repetition of the preceding operation. The counter need not be originally reset to 000, but may be reset to any other number by applying "1" signals to the appropriate "S" and "R" inputs.

Figure 11:
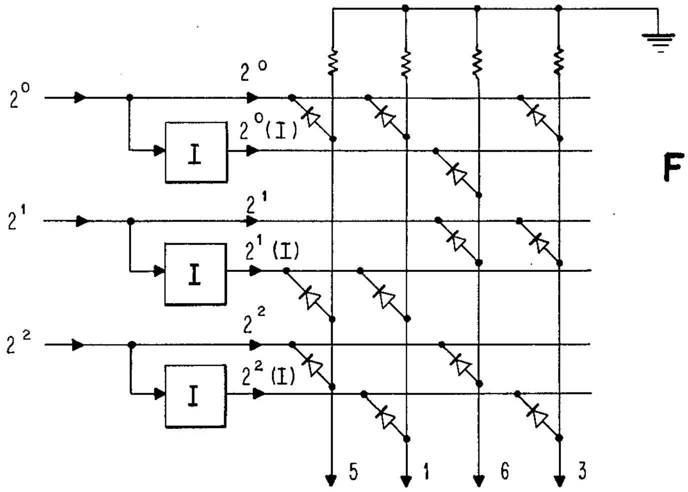

FIG. 11 shows a matrix consisting of diode "and" gates. For purposes of illustration, four outputs are provided. A "1" output is developed on the first (furthest left) vertical lead when the input is 5 (101); on the second vertical lead when the input is 1 (001); on the third vertical lead when the input is 6 (110); and on the last lead when the input is 3 (011). Each input is applied to the matrix on two leads—one lead is applied to diodes directly; the other contains an inverter to develop the complement of the input. If a "0" signal (indicated by a negative voltage) is applied to any diode connected by a vertical lead, current flows through the associated resistor, developing a negative voltage at the output. For example, if the matrix input is 3 (011), a "1" (indicated by zero volts) is present on the $2^0$, $2^1$, and $2^2$(I) horizontal leads and a "0" (negative voltage) is present on the $2^0$(I), $2^1$(I), and $2^2$ horizontal leads. The "0" signals on the $2^1$(I) and $2^2$ horizontal leads cause current to flow in the "5" vertical lead, producing a "0" output indicating that the input is not a "5." Similarly, the "1" vertical lead produces a "0" output due to current flow through the diode connected to the $2^1$(I) horizontal lead, and the "6" vertical lead produces a "0" output due to current flow through the diodes connected to the $2^0$(I) and $2^2$ horizontal leads. However, no current flows in the "3" vertical lead as none of the diodes connected to that lead is also connected to either the $2^0$(I), $2^1$(I), or $2^2$ horizontal leads. This provides a "1" signal output on the "3" vertical lead, indicating the input to be a 3 (011).

It can be seen that the signals on the inverted input leads make the matrix outputs mutually exclusive. Without the signals errors would be developed—for example, either a 5 (101) or a 3 (011) or any other odd number, would operate the 1 output if all that was required for this output was a "1" on the $2^0$ input lead.

R. K. Richards, Digital Computer Components and Circuits, 1957, provides a more detailed description of the operation of similar circuits.

Figure 12:
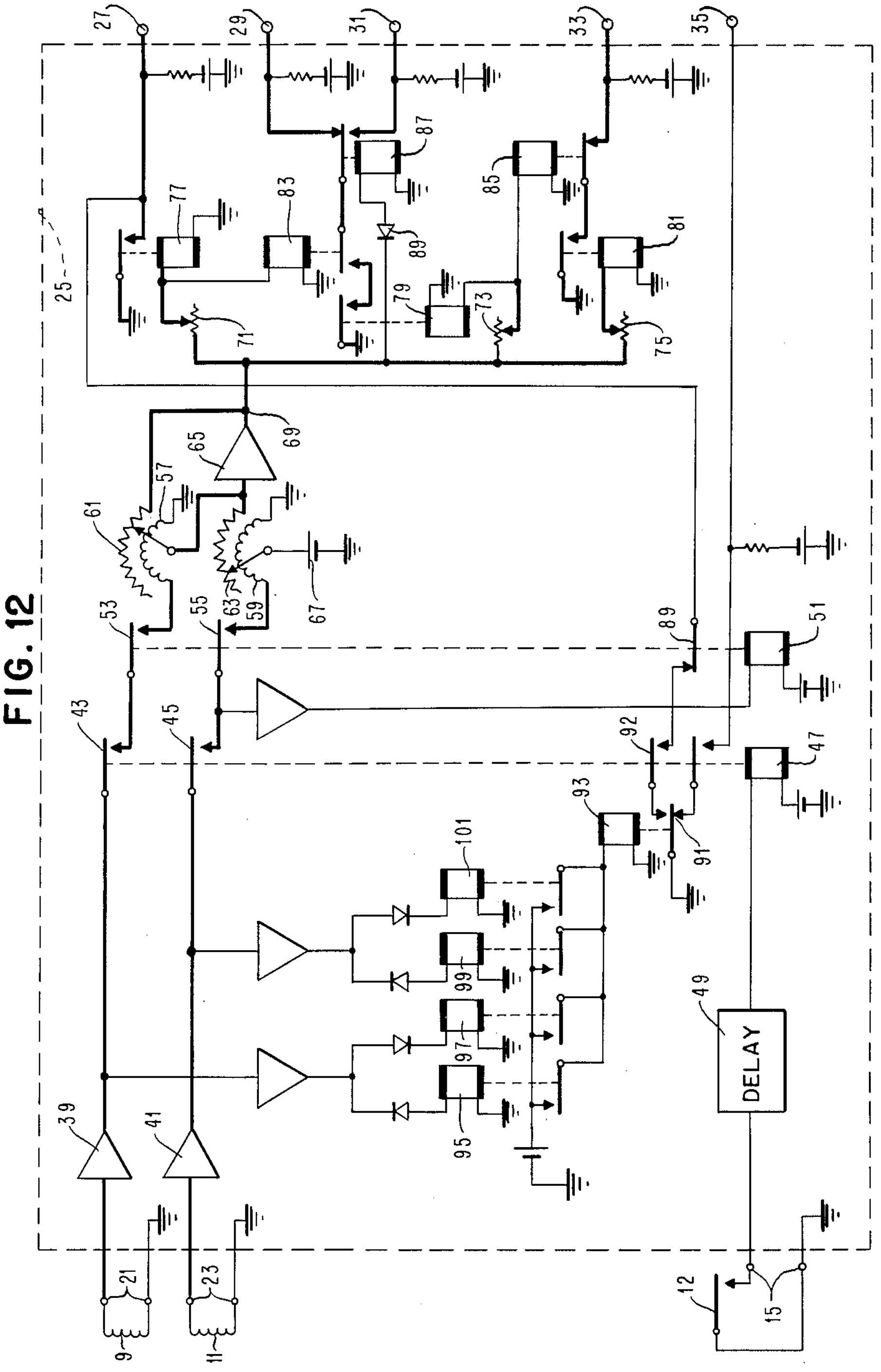
FIG. 12 is a schematic diagram of a basic stroke detector that may be used in the embodiment shown in FIG. 1.

FIG. 12 is a schematic diagram of the basic stroke detector 25 (shown as a block on FIG. 1). This circuit accepts the voltage corresponding to the vertical component of motion induced in the vertical pickup coil 9 and the voltage corresponding to the horizontal component of motion induced in the horizontal pickup coil 11 (at vertical terminals 21 and horizontal terminals 23). In addition, the position of the stylus with respect to the surface (whether it is touching or not) is applied to the circuit from switch 12 (at on-surface terminals 15). The basic stroke detector develops the four basic stroke direction signals (at terminals 27, 29, 31 and 33) and the end of character signal (at terminal 35).

The voltages representing the vertical and horizontal components of motion induced in pickup coils 9 and 11 are amplified by a vertical amplifier 39 and a horizontal amplifier 41 and applied to contacts 43 and 45, respectively, of an on-surface relay 47. When the stylus is touching the writing surface, the on-surface switch 12 is closed, operating the on-surface relay 47 through a delay 49, whose function will be explained below.

The vertical and horizontal components of motion are applied through the on-surface relay contacts 43 and 45 only when the stylus is touching the writing surface, thus blocking hidden motions since they are not used in this embodiment. If any horizontal component of motion is present, horizontal relay 51 operates, transmitting the vertical and horizontal signals through contacts 53 and 55, respectively, to vertical and horizontal galvanometer coils 57 and 59. The purpose of the horizontal relay 51 will be explained below. Vertical potentiometer 61 and horizontal potentiometer 63 are controlled by the galvanometer coils 57 and 59.

A D.C. amplifier is used to divide the vertical component of motion by the horizontal component of motion. It is well known, as shown in Granino A. Korn and Theresa M. Korn, Electronic Analog Computers, 1956 (2nd edition), page 12, that a D.C. amplifier using resistance feedback will multiply the input signal by the ratio of the feedback resistance to the input resistance. A source input signal 67 is applied through the input horizontal potentiometer 63 to the amplifier 65. Feedback is accomplished through the vertical potentiometer 61. Since the vertical and horizontal componens of motion control the galvanometer coils 57 and 59, and, hence, potentiometers 61 and 63, the amplifier output 69 equals the input source 67 multiplied by the vertical component of motion and divided by the horizontal component of motion. The amplifier output 69 is relatively small for horizontal strokes, larger for slanted strokes, and greatest for vertical strokes.

The amplifier output 69 is applied through potentiometers 71, 73 and 75 to vertical stroke relay 77, slant stroke relay 79, and horizontal stroke relay 81, respectively. The horizontal potentiometer 75 is adjusted so that the horizontal stroke relay 81 operates when any amplifier output 69 is present over the inherent circuit noise level. The slant potentiometer 73 is adjusted so that slant stroke relay 79 operates when the amplifier output 69 reaches the level corresponding to either a slant right or slant left stroke. Similarly, the vertical potentiometer 71 is adjusted to cause the vertical stroke relay 77 to operate for levels greater than indicative of a slant stroke. Obviously, any voltage great enough to operate the slant stroke relay 79 will also operate the horizontal stroke relay 81, and any voltage great enough to operate the vertical stroke relay 77 will operate the slant stroke relay 79 and the horizontal stroke relay 81. Inhibit relays 83 and 85 block the outputs of the slant stroke relay 79 and the horizontal stroke relay 81, respectively, to obviate this condition.

The output of the slant stroke relay 79 is applied to the slant right terminal 29 if the amplifier output 69 is positive. Slant left strokes produce a negative voltage at the amplifier output 69, which causes a slant control relay 87 to operate due to current flow through diode 89, applying an output at slant left terminal 31.

Vertical strokes, with little or no horizontal component of motion, will produce an amplifier output 69 sufficiently high to damage the subsequent relays. To obviate this, the horizontal relay 51 is released when the horizontal component is small, removing the signal to the galvanometer coils 57 and 59. In this case, the vertical terminal 27 obtains its output through contact 89 of horizontal relay 51, and contacts 92 of relay 47 and contacts 91 of relay 93 (both operated at this time). One of control relays 95, 97, 99 and 101 operates if any stroke is made, thus operating relay 93. When the vertical amplifier 39 output is negative, control relay 95 is operated; when positive, control relay 97 is operated. Similarly, a negative output from the horizontal amplifier 41 operates the control relay 99 and a positive output operates the control relay 101. An "end of character" signal is developed at the output terminal 35 when the stylus is touched to the writing surface without being moved laterally. In this case, stroke relay 93 is released and the relay 47 is operated. The delay 49 is provided to insure that an "end of character" signal will not be generated as the stylus is first touched to the writing surface when a stroke is started.

FIG. 13*a*–*b* shows the circuit of decoder 37 of FIG. 1. This circuit accepts the basic stroke signals at terminals 27, 29, 31 and 33 and the "end of character" signal at terminal 35 and produces a 26-character output at leads 39.

Each stroke direction is weighted in the decoder (vertical stroke—16, slant right stroke—9, slant left stroke—4, and horizontal stroke—1). The weights of the strokes comprising the character are then summed, and an output is developed on the lead corresponding to the sum weight.

An oscillator 104 applies a continuous pulse output to an "and" gate 106 which, when conditioned by flip-flop 108, passes the oscillator output to an accumulator (or integrator) 103. A complement counter 110 comprised of flip-flops 105, 107, 109 and 111 controls flip-flop 108. If any stroke direction signal occurs, an "or" gate 112 passes a set pulse to flip-flop 108 which conditions "and" gate 106 and, at the same time, sets the complement counter 110 to a value of 16 minus the relative weight of the stroke direction. For example, if a slant right stroke is made, a "1" signal is present on terminal 29 and the complement counter 110 is set to 7 (16 minus 9) as the signal sets flip-flop 105, 107 and 109. The oscillator 104 output pulses are passed through "and" gate 106 to the accumulator 103 and to the complement counter 110. The "and" gate 106 remains conditioned until nine pulses have passed. The ninth pulse, when added to the seven set into the complement counter 110, gives a total count of 0 and "and" gate 113 develops an output to reset flip-flop 108 thus blocking "and" gate 106. Therefore, a slant right stroke causes nine pulses to enter the accumulator 103.

In a similar manner a slant left stroke adds four to the accumulator 103 and the horizontal stroke adds one to the accumulator 103. Since a vertical stroke has a weight of 16, the complement counter 110 is not set, but allowed to count a full 16 pulses. Pulse generator 115 and inverter 117 inhibit "and" gate 113 until the complement counter 110 has counted at least one pulse, thus preventing the reset of flip-flop 108 while the complement counter 110 contains a count of 0 (before beginning its count of 16).

The final column of FIG. 3 shows the accumulator total at the end of each character. The letter "S" is an exception—it is stored as a 3 instead of a 67, as when 67 pulses are applied to the accumulator 103 which has a maximum of 64, the accumulator goes through a full count of 64 and stores the remaining 3.

The end of character signal at terminal 35 triggers pulse generator 119 to provide a conditioning signal for "and" gates 121 through 131, which pass the accumulated (or integrated) character weight to the diode matrix decoder 133 (FIG. 13*b*) through terminals 122 through 132. The matrix inherently "stores" reference characters by the placement of the diodes. For example, the character "A" is stored as 001110, because the $2^1$, $2^2$ and $2^3$ input leads and the $2^0$(I) and $2^4$(I) and $2^5$(I) input leads are connected to the "A" output lead. The end of character signal also resets the flip-flops in accumulator 103 through a delay 120. The delay insures that the accumulator total will affect the matrix before the accumulator is reset. The matrix 133 provides an output on a vertical lead if "1" signals are present on all diode-connected horizotal leads. Inverters 135 through 145 apply "1" signals to the alternate horizontal leads.

The operation of the system for the character "A" is as follows:

(a) The character "A" is traced with the stylus, using one slant right stroke, one slant left stroke, and one horizontal stroke, in any order.

(b) The basic stroke detector provides three successive outputs; one on the slant right terminal 29, one on the slant left terminal 31, and one on the horizontal terminal 33, in the order that the strokes are made.

(c) The decoder accumulator receives three groups of pulses; one group containing nine pulses (corresponding to the slant right stroke), one group containing four pulses (corresponding to the slant left stroke), and one "group" containing one pulse (corresponding to the horizontal stroke). The accumulator sums (integrates) these pulses for a total of fourteen (001110).

(d) The stylus is touched to the writing surface without being moved laterally.

(e) An "end of character" signal is generated which conditions "and" gates 121 through 131, causing the accumulator total to pass to the decoder matrix.

(f) The accumulator sum of 14 (001110) causes "1" signals to be present on the horizontal leads labelled $2^0$(I), $2^1$, $2^2$, $2^3$, $2^4$(I), and $2^5$(I). All vertical leads in the matrix, with the exception of the "A" lead have current flowing through their associated resistors, developing a negative voltage (indicating a "0") at each of their outputs. Since no current flows through the resistor associated with the "A" vertical lead, a "1" output is developed, indicating the character traced to have been an "A."

(g) The accumulator flip-flops are reset to 0(000000) by the "end of character" through delay 120.

FIG. 14 shows an electromechanical accumulator 147 that could be used to replace the electronic accumulator 103 shown on FIG. 13*a*. Each pulse from "and" gate 106 is applied through the terminal 148 and "or" gate 149 to the ratchet solenoid 151, pulling down arms 153 and 155, rotating the code wheel 157 one position for each pulse applied. Detent 159 holds the code wheel 157 at one of the 64 discrete positions of the wheel. The sloped surface 161 of the arm 155 permits the arm to move past the raised portions of the code wheel 157 between steps. The code wheel is made of an insulating material and is coated with a conducting material according to a binary code at the areas that are stippled on the drawing. One input brush 162 and six output brushes 164 electrically contact the code wheel. The "end of character" signal at terminal 35 provides a pulse through brush 162 to the center section of the code wheel 157, and hence, to all stippled portions of the code wheel, which reads out the accumulated (integrated) total through output brushes 164 to terminals 122 through 132 (FIGS. 13*b* and 14) at the termination of the written character. The accumulator is reset in the following manner. The end of character signal is also delayed and applied to flip-flop 163. This flip-flop output conditions "and" gate 165. The oscillator 167 output is then passed through "or" gate 149 to operate the ratchet solenoid 151. The code wheel 157 is thus rotated until it reaches its zero position, when a pulse is developed to reset flip-flop 163, inhibiting "and" gate 165. It is only at the zero position that "or" gate 169 has a "0" signal output, which is inverted and applied to pulse generator 170 to reset flip-flop 163.

A preferred embodiment uses hidden motion, and stroke sequence and relative position, to lower the standard of character conformity required in the manner to be described. In this embodiment, several characters may have the same number of basic strokes. A 26-letter alphabet and a 10-digit numbering system are illustrated in FIG. 15*a–b*. This chart shows several variations of the writing of several of the characters. In the detailed embodiment, 8 basic stroke directions are used—the basic four are doubled by considering the direction of movement, e.g., slant right up or slant right down. FIGS. 16 and 17–17*s* show a circuit to recognize the characters written, as shown in FIG. 15*a–b*. The circuit could be expanded, making greater use of hidden motion and stroke sequence and position to further lower the standard of character conformity. Each of the above principles will be shown by one or more examples.

An example of the use of stroke sequence to detect characters having the same combination of strokes is found by comparing (in FIG. 15*b*) the characters "Q" (200) and "R" (202). Each may contain one vertical down stroke, one vertical up stroke, one horizontal left stroke, one horizontal right stroke, and one slant right down stroke, but the sequence of strokes is different. An example of the use of hidden motion to detect two charcters having the same combination and sequenec of strokes is seen in comparing (in FIG. 15*b*) the characters "V" (204) and "X" (206), each containing one slant left down stroke and one slant right up stroke. In writing the character "X," a hidden motion is made between the strokes, which does not occur when writing the character "V." The direction of hidden motion is used to detect the characters "I" (208) and "F" (210). Both may be written using a vertical down stroke followed by two horizontal right strokes. The hidden motion between the vertical stroke and the first horizontal stroke is in the slant left direction when an "I" is written—the hidden motion is vertical when an "F" is written.

An example of using relative stroke positions to detect characters having the same combination of strokes, the same sequence of strokes, and the same hidden motion is seen by comparing the characters "D" (212) and "P" (214) or "L" (216) and "T" (218). It may be noted that a "P" contains no horizontal strokes as low as the bottom of the left vertical stroke, whereas "D" contains its lowest horizontal stroke at a level equal to the bottom of the vertical stroke. These examples are used to show a the letter "T" is at the top of the vertical stroke whereas the horizontal stroke in the letter "L" is at the bottom of the vertical stroke These examples are used to show a method of stroke detection which could be extended to further lower the standard of conformity of other characters.

FIG. 16 shows a preferred embodiment input transducer, which differs from the embodiment shown in FIG. 1 in the addition of a vertical position potentiometer 171. The position of the stylus on the surface determines the amplitude of positive voltage at the arm 175 of the potentiometer 171 and is used in the detection of relative stroke position. The arm is rigidly mounted on the pantograph through an insulated lug 179. The voltage at the arm 175 is applied to a terminal 183 through a conductor 178.

In FIG. 17*a*, the vertical component of motion voltage induced in the vertical pickup coil 9 is applied to the vertical amplifier 203 through a filter comprised of resistor 205 and capacitor 207. The filter provides an output representative of the overall stroke, ignoring short-time stylus movement, such as at the beginning of and at the end of a stroke, that may be in random directions. The vertical amplifier 203 output may vary above and below zero volts, as is common practice in the design of D.C. amplifiers. Similarly, the horizontal component of motion voltage induced in the horizontal pickup coil 11 is applied to the horizontal amplifier 209 through a filter comprised of resistor 211 and capacitor 213. The diode and resistor circuit following each amplifier blocks small signals which are due to either noise or slight or spurious movement of the stylus. If the vertical amplifier 203 output is positive and greater than the voltage of the potentiometer 215, diode 217 conducts, applying a signal to amplifier 219. Similarly, a negative output from the vertical amplifier 203 that is sufficient to overcome the voltage of the potentiometer 221 causes current flow through diode 223, and hence, a pulse to be applied to amplifier 225. The potentiometers 215 and 221 are adjusted to block conduction of diodes 217 and 223 when a horizontal stroke is made, which is insufficient to block diode conduction if a vertical, slant right, or slant left stroke is made. Components 227 through 237 operate in a similar manner to detect a horizontal component of motion. A vertical component in the upward direction is presumed to provide a positive signal at terminal 21 and, hence, a "1" signal to be present at the set input of vertical up flip-flop 243. A vertical component in the downward direction is presumed to provide a negative output at terminal 21 and a "1" input to the set input of vertical down flip-flop 245, after inverter 244 converts the negative going signal into a positive going signal. Similarly, a horizontal right component sets flip-flop 247 and a horizontal left component sets flip-flop 249 (through inverter 248). "1" signals are present at the pulse inputs of "and" gate 255 when amplifiers 219 and 225 have outputs of insufficient amplitude to set flip-flops 243 and 245. Inverter 246 provides a "1" output when a "0" signal is present at the output of amplifier 219, indicating no vertical up movement of the stylus. Vertical down movement inhibits "and" gate 255 by causing a negative going signal at the output of amplifier 225. "And" gate 255 provides a set pulse to horizontal flip-flop 251 if there is an insufficient vertical up or down component of movement of the stylus to set flip-flop 243 or 245 (as explained above) and, at the same time, there is sufficient horizontal component of motion to provide an output from either flip-flop 247 or 249 through "or" gate 257. In a similar manner, the vertical flip-flop 253 is operated by a signal from "and" gate 259 when there is an insufficient horizontal component of motion to set either flip-flop 247 (through the effect of inverter 250) or 249, but there is a sufficient vertical component of motion to set either flip-flop 243 or 245 and thus to provide a signal through "or" gate 261.

The output of each flip-flop is applied to two groups of "and" gates (271*a*–278*a* and 271*b*–278*b*). The eight basic strokes are obtained by selecting the appropriate components of motion. The slant right up output at lead 263 is present when the vertical up flip-flop 243 has been set and the horizontal right flip-flop 247 has been set. Similarly, outputs through leads 264 through 270 are obtained by the correct selection of components of movement of the stylus. "And" gates 271*b* through 278*b* are inhibited when the stylus is removed from the surface as will be explained below. As soon as any output is present at leads from "and" gates 271*a* through 278*a*, "or" gate 279 provides a signal to set flip-flop 280. The "1" output of flip-flop 280 resets flip-flops 243 through 253 and operates relay 281. The operation of relay 281 places the vertical discharge resistor 283 in parallel with capacitor 207 and the horizontal discharge resistor 285 in parallel with capacitor 213, discharging the capacitors. Delay 287 insures that capacitors 107 and 113 are not discharged before flip-flops 243 through 253 are reset. Flip-flop 280 is reset when contacts 282 of relay 281 operate.

A "1" signal, indicating a hidden motion, is present at lead 291 if there is some component of movement of the stylus and the stylus is not touching the surface. "Or" gate 293 develops a "1" output when the stylus is moved in any direction. Switch 12 is open when the stylus is not touching the surface, producing a "0" signal at the input of inverter 297 (due to negative voltage from battery 295), and a "1" signal at inverter 297 output. This causes a "1" signal at lead 291, when a hidden motion is being made. Inverter 300 develops a "0" signal when there is a hidden motion, inhibiting "and" gates 271 through 278.

The subsequent detection circuits also require a vertical up hidden motion signal and a slant left up hidden motion signal. "And" gates 302 and 304 are conditioned by the hidden motion signal at lead 291 to develop these outputs at leads 306 and 308, respectively.

The subsequent circuits also require an "end of character" signal (at lead 301) and two reset signals (R1 at lead 310 and R2 at lead 312). The end of character signal is developed at lead 301 when the stylus is touched to the surface without being moved laterally. This causes switch 12 to produce a "1" signal at the input of "and" gate 303 while inverter 305 is developing a "1" signal from the "0" output of "or" gate 293. The reset signals occur later than the end of character signal. R1 is delayed by delay 314. The end of character signal sets flip-flop 316, which conditions "and" gate 317. As the first movement of the stylus after the end of character signal is made, the signal from "or" gate 279 (discussed previously) is passed through "and" gate 317 to lead 312 as R2. Flip-flop 316 is reset by R2.

FIG. 17 is a diagram showing the arrangement of FIGS. 17*b*–*p*. FIGS. 17*b*–*s* show the detailed embodiment decoding circuits. FIGS. 15*a*–*b* show the permissible method of writing each character to be detected. The second column of this table is the reference to the schematic drawings. Several characters may be written with more than one stroke combination. Where the schematic diagram has several outputs labeled with the same character, combination could be achieved by the use of an "or" gate.

The signals developed on FIG. 17*a* are referenced to FIGS. 17*b*–*s*—the leads are not connected (as they would be in constructing the device).

The decoder is comprised of several flip-flop "trees." The sequence and interconnections in the decoder circuit provide reference storage for comparison with the input data. The furthest left flip-flops shown (401 and 402 on FIG. 17*b*, 403 on FIG 17*c*, 404 on FIG. 17*i*, 405 on FIG. 17*l*, 406 on FIG. 17*o*, and 407 on FIG. 17*p*) are controlled by the first stroke of the character. Since no characters are formed with an initial slant left up stroke, only 7 input flip-flops are required. The set inputs to each of the flip-flops are passed through "and" gates which, in conjunction with the associated circuitry, assures that only the first stroke controls flip-flops 401 through 407. In the case of flip-flop 401, the vertical right up input passes to the set input of the flip-flop only if a conditioning signal is present on lead 411. This occurs only when flip-flops 402 through 407 are reset. If a slant right up stroke occurs after the first character stroke, one of flip-flops 402 through 407 will be set by the first stroke, inhibiting this signal from setting flip-flop 401.

Flip-flops 401 through 407 have outputs that condition "and" gates in the circuits of subsequent flip-flops. For example, the output of flip-flop 401 conditions "and" gates 412 and 413. If the slant right up stroke to flip-flop 401 is followed by an end of character signal, "and" gate 412 passes an output to set flip-flop 414, which provides an output on lead 415, signifying that the character "1" has been written. If the slant right up stroke is followed by either a slant left up or down stroke, "or" gate 416 and "and" gate 413 pass the signal to set flip-flop 417. If the stroke following this is a horizontal right or left stroke, flip-flop 418 is set. If an end of character signal occurs next, flip-flop 419 is set, providing a signal at lead 420, indicating that the character "A" has been written. Thus, in this case, the reference character "1" is stored as a slant right up stroke, followed by an end of character signal, and the references character "A" is stored as a slant right up stroke followed by either a slant left up or down stroke, followed by a horizontal left or right stroke, and terminated by an end of character signal. Whereas, any type of storage of reference characters could be used; in this embodiment, the storage is inherent in the circuit interconnections. The "0" output of flip-flop 414 conditions "and" gate 413 and the "0" output of flip-flop 417 conditions "and" gate 412, making the circuits mutually exclusive, similar to flip-flops 401 through 407. R1 occurs at a time after the end of character signal, resetting all flip-flops except the last one in the chain. R2 occurs as the next stroke after the end of character signal is made, resetting the final flip-flop. Each chain could have an individual reset circuit obviating the need of R1 and R2. FIG. 17*q* shows the circuits similar to that at the top of FIG. 17*b*, using this method of reset. The differentiators 425 and 426 develop pulses on leads 427 and 428 at the beginning of the outputs at leads 415 and 420, respectively. These pulses reset the flip-flops in the chain that develops the output. Pulse 427 resets flip-flops 401 (through "or" gate 431) and 414; 428 resets flip-flops 401 (through "or" gate 431) 417, 418 and 419. Delays 429 and 430 retard the resetting of the final flip-flops of the chain. This method of resetting could be extended to all of the circuits on FIGS. 17*b* through 17*p* in place of the R1 and R2 signals. In the more complicated chains more "or" gates would be required as several flip-flops are used for more than one chain.

A space between groups of characters is indicated by two end of character signals in sequence. FIG. 17*j* shows a circuit to detect this condition.

FIG. 17*a* shows the use of a hidden motion to determine whether a "V" or "X" has been formed by a slant left stroke and a slant right stroke. The "V" has no hidden motion between strokes; the "X" contains a hidden motion. FIG. 17*d* shows the use of a directed hidden motion. The "F" contains a vertical up hidden motion; the "I," a slant left up hidden motion.

FIG. 17*f* shows the use of the vertical position voltage referred to in FIG. 16, to detect "L" and "T." As the vertical down first character stroke is formed, relay 450 is operated. Contacts 451 and 452 pass the voltage from the vertical position potentiometer 171 to capacitors 433 and 454, respectively. The RC time constant for resistors 459 and 460, potentiometer 171, and capacitors 453 and 454 is rapid enough so that the capacitor voltages essentially follow the voltage at arm 175 of the potentiometer 171. At the termination of the first stroke, relay 450 is released and the capacitors 453 and 454 retain their charge. As the next stroke (which is horizontal) is made, relay 455 operates and potentiometer 171 is again connected to the capacitor 453, through relay contact 456. If the vertical level of the horizontal stroke is above the level of the bottom of the first vertical stroke, capacitor 453 charges toward the higher voltage, producing a positive voltage pulse at the ungrounded end of resistor 459. This pulse is applied through relay contact 458 and capacitor 461 to overcome the negative voltage supply 462, thus setting flip-flop 457. If the end of character movement is made before additional strokes (for "H," "E," or "4") are made, "and" gate 463 provides a set output to flip-flop 464 indicating a "T." When an "L" is made, the vertical level of the horizontal stroke equals the vertical level of the bottom of the vertical stroke, and resistor 453 does not charge as the horizontal stroke is made. Thus, flip-flop 457 is not set and an "L" is indicated. In the same manner, a "P" and a "D" are differentiated as shown on FIG. 17*h*.

The remainder of the circuits on FIGS. 17*b*–*p* are not explained as they are similar to the operation of the described circuits.

Many of the flip-flops in the associated circuits are redundant. FIG. 17*r* shows a circuit similar to that at the top of FIG. 17*b*, deleting the unnecessary circuits. Since only the characters "A" and "1" are started with a slant right up stroke, it is obvious that if the signal after the slant right stroke is not an end of character signal, the character "A" is being written; if it is an end of character signal, the character "1" has been written. This circuit provides an output before the character has been finished in many cases (as with the character "A"). These circuits were not deleted in FIGS. 17*b*–*p* to simplify an understanding of the circuit and to permit the addition of an error checking circuit, based on redundancy.

FIG. 17*s* shows a circuit similar to that at the top of FIG. 17*b*, including an error checking circuit. Flip-flop 440 is set after the first stroke (slant right up stroke). If the next stroke is incorrect for any identifiable character (if it is anything except slant left up or down, which are correct for the character "A"; or end of character, which is correct for the character "1"), "and" gate 441 passes a signal through "or" gate 442 to output 443. When there is no error, flip-flop 440 is reset by the end of character signal (correct for the character "1") or either a slant left up or down signal (correct for the character "A"). If an error is present, flip-flop 440 is reset by R2. If flip-flop 440 were not reset in this manner (as soon as the next stroke occurs, if correct), the flip-flop would maintain "and" gate 441 open, and the correct third stroke for the character "A" (horizontal left or right) would pass through "and" gate 441 and appear as an error. This circuit could be expanded to provide an error indication for all of the circuits on FIGS. 17*b*–*p*. Each "or" gate (similar to "or" gate 444, 445 or 446) would be constructed with an input for each signal that would be incorrect for any detectable character. This method of error checking obviously cannot detect characters written by mistake, but can only detect that a non-identifiable character has been written.

Where there is more than one output for a single character, the outputs could be applied to an "or" gate providing a single output. For example, the three separate outputs generated on FIGS. 17*b* and 17*n* for the character "A" could be combined through an "or" gate into a single output.

The end of character signal could be deleted and the circuits could be reset as soon as any identifiable character was written. In this case, no character could be comprised of a sequence that forms the beginning of another character, without the use of additional circuitry making greater use of hidden motion. For example, the circuit on FIG. 17*b* would have to be changed, or the first stroke of the character "A" would always be identified as a "1." The use of the end of character signals has the advantage of providing a correction feature in that it establishes the start and finish of each character.

While the invention has been particularly shown and described with reference to preferred embodiments thereof, it will be understood by those skilled in the art that the foregoing and other changes in form and detail may be made therein without departing from the spirit and scope of the invention.

We claim:

1. An apparatus comprising externally-controllable means for tracing a character including a laterally-rigid, surface-engaging member, and means responsive to directions of movement of said tracing means and independent of the horizontal or vertical registration of the tracing means for identifying the character traced.

2. The apparatus described in claim 1, wherein the responsive means comprises storage means.

3. An apparatus comprising externally-controllable means for tracing a character including a laterally-rigid, surface-engaging member, and means responsive to the direction of motion of said tracing means during each stroke of the character traced and independent of the horizontal or vertical registration of the tracing means for identifying said character.

4. The apparatus described in claim 3, wherein the responsive means comprises storage means.

5. An apparatus, comprising externally-controllable means for tracing a character including a laterally-rigid, surface-engaging member, and means responsive to the direction and sequence of movements of said tracing means and independent of the horizontal or vertical registration of the tracing means for identifying the character traced.

6. The apparatus described in claim 5, wherein the responsive means comprises storage means.

7. An apparatus, comprising means for tracing a character; means responsive to said tracing means to indicate the directions of movement of strokes of said tracing means; means responsive to the tracing means to indicate the relative position of a stroke with respect to another stroke of the character; and means responsive to both said responsive means and independent of the horizontal or vertical registration of the tracing means for identifying the character traced.

8. An apparatus, comprising: means for tracing a character; means responsive to said tracing means to indicate the directions of movement of each stroke of said tracing means; means responsive to the tracing means to indicate the relative position of a stroke with respect to another stroke of the character; and means, comprising storage means, responsive to both said responsive means and independent of the horizontal or vertical registration of the tracing means for identifying the character traced.

9. An apparatus comprising, in combination: tracing means; signal generating means responsive to movement of said tracing means, for generating separate signals for certain different directions of movement; integrating means, responsive to signals generated by the signal generating means for summing functions of the signals; and means, comprising storage means, responsive to said integration and independent of the horizontal or vertical registration of the tracing means for identifying the character traced.

10. An apparatus for detecting a handwritten character comprising in combination: means for tracing a character; means responsive to the tracing means to indicate the relative position of a stroke with respect to another stroke of the character; means responsive to the tracing means to indicate the direction of movement and sequence of movements of the tracing means; and means responsive to the position-responsive means, and the direction and sequence responsive means, and independent of the horizontal or vertical registration of the tracing means, for identifying the character traced.

11. An apparatus for detecting a handwritten character comprising in combination: means for tracing a character; means responsive to the tracing means to indicate the relative position of a stroke with respect to another stroke of the character; means responsive to the tracing means to indicate the direction of movement and sequence of movements of the tracing means; and means, comprising storage means, responsive to the position-responsive means, and the direction and sequence responsive means, and independent of the horizontal or vertical registration of the tracing means, for identifying the character traced.

12. An apparatus for detecting a handwritten character comprising in combination: means for tracing a character; a tracing surface; means responsive to the tracing means to indicate the relative position of a stroke with respect to another stroke of the character; indicating means responsive to the tracing means to indicate when the tracing means is touching said surface; means responsive to the tracing means to indicate the direction of movement of the tracing means; and means responsive to the direction-responsive means, the position-responsive means, the indicating means, and the sequence of the strokes, and independent of the horizontal or vertical registration of the tracing means, for identifying the character traced.

13. An apparatus for detecting a handwritten character comprising, in combination: means for tracing a character; a tracing surface; means responsive to the tracing means to indicate the relative position of a stroke with respect to another stroke of the character; indicating means responsive to the tracing means to indicate when the tracing means is touching said surface; means responsive to the tracing means to indicate the direction of movement of the tracing means; and means comprising storage means responsive to the direction-responsive means, the position-responsive means, the indicating means, and the sequence of the strokes, and independent of the horizontal or vertical registration of the tracing means for identifying the character traced.

14. An apparatus for detecting a handwritten character comprising, in combination: means for tracing a character; pantographic means to convert the motion of the tracing means into two components of motion which are independent of the horizontal or vertical registration of the tracing means; means responsive to the two components of motion to indicate whether each stroke made is essentially composed of a single one of said components or a combination of said components; means responsive to the indications of the last-mentioned means to assign a predetermined value to each stroke dependent upon its direction; means for summing the values of the strokes comprising the character; and decoding means responsive to the total character value for identifying the character traced.

15. An apparatus as described in claim 14, characterized by the fact that the summing means is an electronic counter.

16. An apparatus as described in claim 14, characterized by the fact that the summing means is an electromechanical code wheel.

17. An apparatus for detecting a handwritten character comprising in combination: means for tracing a character; pantographic means to convert the motion of the tracing means into two components of motion which are independent of the horizontal or vertical registration of the tracing means; means responsive to the two components of motion to indicate whether each stroke made is essentially composed of a single one of said components or a combination of said components; means responsive to the indications of the last-mentioned means to assign a predetermined value to each stroke dependent upon its direction; means for summing the values of the strokes comprising the character; and decoding means, comprising storage means, responsive to the total character value for identifying the character traced.

18. An apparatus for detecting a handwritten character comprising in combination: means for tracing a character; means to convert the motion of the tracing means into two components of motion which are independent of the horizontal or vertical registration of the tracing means; means responsive to the two components of motion to indicate whether each stroke made is essentially composed of a single one of said components or a combination of said components; and means responsive to said last-mentioned indications for identifying the character traced.

19. An apparatus for detecting a handwritten character comprising in combination: means for tracing a character; means to convert the motion of the tracing means into two components of motion which are independent of the horizontal or vertical registration of the tracing means; means responsive to the two components of motion to indicate whether each stroke made is essentially composed of a single one of said components or a combination of said components; and means, comprising storage means, responsive to said last-mentioned indications for identifying the character traced.

20. An apparatus for detecting handwritten characters comprising in combination: means for tracing a character; means responsive to said tracing means to indicate for each stroke whether the stroke made is vertical, slant right, horizontal, or slant left, and independent of the horizontal or vertical registration of the tracing means; and means responsive to said last-mentioned indications for identifying the character traced.

21. An apparatus for detecting a handwritten character comprising in combination: means for tracing a character; pantographic means to convert the motion of the tracing means into two components of motion substantially at right angles to each other which are independent of the horizontal or vertical registration of the tracing means; means responsive to the two components of motion to indicate whether each stroke made is vertical up, vertical down, slant right up, slant right down, horizontal right, horizontal left, slant left up, or slant left down; means for storing said indications; and means responsive to said stored indications for identifying the character traced.

22. An apparatus comprising means for tracing a character and inductively-coupled means responsive to directions of movement of said tracing means and independent of the horizontal or vertical registration of the tracing means for identifying the character traced.

23. An apparatus, comprising means for tracing a character, and inductively-coupled means responsive to the direction of motion of said tracing means during each stroke of the character traced and independent of the horizontal or vertical registration of the tracing means for identifying said character.

24. An apparatus, comprising means for tracing a character, and inductively-coupled means responsive to the direction and sequence of movements of said tracing means and independent of the horizontal or vertical registration of the tracing means for identifying the character traced.

References Cited by the Examiner

UNITED STATES PATENTS

| | | | |
|---|---|---|---|
| 957,050 | 5/10 | Golden | 178—19 |
| 1,117,184 | 11/14 | Goldberg. | |
| 1,165,663 | 12/15 | Goldberg. | |
| 1,285,098 | 11/18 | Flannery | 340—337 |
| 1,815,996 | 7/31 | Weaver | 178—4 |
| 2,141,388 | 12/38 | Harrison | 178—19 |
| 2,682,045 | 6/54 | Crost | 178—19 |
| 2,685,611 | 8/54 | Taylor | 178—19 |
| 2,741,312 | 4/56 | Johnson. | |
| 2,889,535 | 6/59 | Rochester et al. | |
| 2,928,074 | 3/60 | Sutter. | |
| 2,964,734 | 12/60 | West. | |
| 3,016,421 | 1/62 | Harmon | 178—19 |
| 3,050,711 | 8/62 | Harmon. | |
| 3,108,254 | 10/63 | Dimond | 340—146.3 |
| 3,127,588 | 3/64 | Harmon | 340—146.3 |

FOREIGN PATENTS

| | | |
|---|---|---|
| 6,271 | 5/01 | Great Britain. |
| 229,622 | 10/58 | Australia. |
| 233,210 | 4/61 | Australia. |
| 846,722 | 8/60 | Great Britain. |
| 854,150 | 10/52 | Germany. |
| 1,211,520 | 10/59 | France. |

OTHER REFERENCES

Publication: "Handwriting Reader Has a Ten Word Vocabulary," in Electrical Engineering, vol. 78, No. 12, December 1959, pp. 1241–42.

MALCOLM A. MORRISON, *Primary Examiner.*

NEIL C. READ, IRVING L. SRAGOW, *Examiners.*